United States Patent
Mukhtarov et al.

(10) Patent No.: US 10,715,792 B2
(45) Date of Patent: Jul. 14, 2020

(54) DISPLAY DEVICE AND METHOD OF CONTROLLING THE SAME

(71) Applicant: SAMSUNG ELECTRONICS CO., LTD., Suwon-si (KR)

(72) Inventors: Farid Mukhtarov, Suwon-si (KR); Ki-hyung Kang, Suwon-si (KR); Seung-jun Jeong, Hwaseong-si (KR); Seon-deok Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 941 days.

(21) Appl. No.: 15/093,296

(22) Filed: Apr. 7, 2016

(65) Prior Publication Data
US 2016/0301918 A1   Oct. 13, 2016

(30) Foreign Application Priority Data

Apr. 7, 2015   (KR) .................. 10-2015-0049015
Feb. 12, 2016   (KR) .................. 10-2016-0016447

(51) Int. Cl.
| | |
|---|---|
| *H04N 13/354* | (2018.01) |
| *H04N 13/312* | (2018.01) |
| *H04N 13/317* | (2018.01) |
| *H04N 13/324* | (2018.01) |
| *H04N 13/359* | (2018.01) |
| *G02B 30/27* | (2020.01) |
| *G02B 30/36* | (2020.01) |

(52) U.S. Cl.
CPC .......... *H04N 13/354* (2018.05); *G02B 30/27* (2020.01); *G02B 30/36* (2020.01); *H04N 13/312* (2018.05); *H04N 13/317* (2018.05); *H04N 13/324* (2018.05); *H04N 13/359* (2018.05)

(58) Field of Classification Search
None
See application file for complete search history.

(56) References Cited

U.S. PATENT DOCUMENTS

| | | |
|---|---|---|
| 6,971,748 B2 | 12/2005 | Cho et al. |
| 8,872,904 B1 | 10/2014 | Hwang et al. |

(Continued)

FOREIGN PATENT DOCUMENTS

| | | |
|---|---|---|
| CN | 102346307 A | 2/2012 |
| CN | 102959457 A | 3/2013 |

(Continued)

OTHER PUBLICATIONS

Communication dated Jul. 25, 2018, issued by the European Patent Office in counterpart European Application No. 16776886.0.

(Continued)

*Primary Examiner* — Kenneth B Lee, Jr.
(74) *Attorney, Agent, or Firm* — Sughrue Mion, PLLC

(57) ABSTRACT

A display device and a method of controlling the same are provided. The display device includes: a display panel including a plurality of pixels, each of which includes a plurality of sub pixels; a prism panel at one side of the display panel and including a prism array and a liquid crystal; a prism panel driver configured to apply voltage to the prism panel; and a controller configured to display a plurality of image frames on the display panel and to control a driving state of the prism panel variably while the plurality of image frames is displayed.

16 Claims, 21 Drawing Sheets

(56) References Cited

U.S. PATENT DOCUMENTS

| | | | |
|---|---|---|---|
| 9,253,475 B2 | 2/2016 | Itoh | |
| 9,448,459 B2 | 9/2016 | Pijlman | |
| 9,646,543 B2 | 5/2017 | Kang et al. | |
| 2002/0008812 A1 | 1/2002 | Conner et al. | |
| 2003/0090597 A1* | 5/2003 | Katoh | H04N 9/3111 348/744 |
| 2011/0235145 A1 | 9/2011 | Futterer et al. | |
| 2012/0026161 A1* | 2/2012 | Chen | G02B 5/06 345/419 |
| 2012/0206511 A1 | 8/2012 | Pijlman | |
| 2012/0206636 A1 | 8/2012 | Pijlman et al. | |
| 2012/0223879 A1 | 9/2012 | Winter | |
| 2012/0306726 A1 | 12/2012 | Song et al. | |
| 2013/0077024 A1 | 3/2013 | Shikii et al. | |
| 2013/0093861 A1 | 4/2013 | Itoh | |
| 2013/0113767 A1 | 5/2013 | Hayashi et al. | |
| 2014/0091990 A1 | 4/2014 | Chang | |
| 2014/0146091 A1 | 5/2014 | Kang et al. | |
| 2014/0176835 A1 | 6/2014 | Hayashi | |
| 2014/0327710 A1 | 11/2014 | Xu et al. | |

FOREIGN PATENT DOCUMENTS

| | | |
|---|---|---|
| CN | 103713388 A | 4/2014 |
| CN | 103838033 A | 6/2014 |
| CN | 104122712 A | 10/2014 |
| EP | 1306712 A1 | 5/2003 |
| EP | 2320668 A2 | 5/2011 |
| JP | 09-113928 A | 5/1997 |
| JP | 2012-194402 A | 10/2012 |
| KR | 10-2004-0011761 A | 2/2004 |
| KR | 10-2006-0093610 A | 8/2006 |
| KR | 10-2012-0099586 A | 9/2012 |
| KR | 10-2012-0105456 A | 9/2012 |
| KR | 10-2014-0137971 A | 12/2014 |
| KR | 10-2014-0145862 A | 12/2014 |

OTHER PUBLICATIONS

Stolle, H., et al., "Technical solutions for a full-resolution auto-stereoscopic 2D/3D display technology", Feb. 14, 2008, Proceedings of SPIE, vol. 6803, XP055049653, 12 pages total.

Yang, Deng-Ke, et al., "Prism-based beam steering", Sep. 24, 2014, Fundamentals of Liquid Crystal Devices, Retrived from http://ebookcentral.proquest.com/lib/epo-books/detail.action?docID=1798777, XP055491086.

Communication dated Mar. 2, 2018, from the European Patent Office in counterpart European Application No. 16776886.0.

International Search Report (PCT/ISA/210) dated Aug. 26, 2016 issued by the International Searching Authority in counterpart International Application No. PCT/KR2016/003663.

Written Opinion (PCT/ISA/237) dated Aug. 26, 2016 issued by the International Searching Authority in counterpart International Application No. PCT/KR2016/003663.

Communication dated Mar. 19, 2019 issued by the European Intellectual Property Office in counterpart European Application No. 16 776 886.0.

Communication dated Oct. 9, 2019, from the State Intellectual Property Office of People's Republic of China in counterpart Application No. 201680011744.0.

* cited by examiner

DISPLAY DEVICE AND METHOD OF CONTROLLING THE SAME

CROSS-REFERENCE TO RELATED APPLICATIONS

This application claims priority under 35 U.S.C. § 119 from Korean Patent Application No. 10-2015-0049015, filed on Apr. 7, 2015 in the Korean Intellectual Property Office, and Korean Patent Application No. 10-2016-0016447, filed on Feb. 12, 2016 in the Korean Intellectual Property Office, the disclosures of which are incorporated herein by reference in their entireties.

BACKGROUND

1. Field

Apparatuses and methods consistent with exemplary embodiments relate to a display device and a method of controlling the same, and more particularly, to a display device that increases a resolution of a display device, and a method of controlling the same.

2. Description of the Related Art

The recent development of a wired/wireless Internet and of information communication devices has rapidly increased the amount and quality of information accessible to a user. The development of such electronic technologies has resulted in advances in three-dimensional (3D) imaging. Here, in addition to a two-dimensional (2D) image, a 3D image is really and stereoscopically seen, felt, and enjoyed based on a terminal such as a television (TV), a smartphone, or the like that processes text, voices, images, or the like at a high speed.

A human recognizes a 3D world according to a principle of a stereoscopic vision of two eyes. In other words, the human acquires two images having different views through the two eyes that are horizontally spaced apart by about 65 mm and analyzes a difference between the two images in a brain to reconstitute and recognize the two images as a single 3D image having a depth.

A stereoscopic display device uses a principle of a stereoscopic vision using a binocular disparity of a human and is classified into a stereoscopic type and an autostereoscopic type according to whether an observer additionally wears glasses. The autostereoscopic type may be further classified into a multi-view binocular disparity type, a volumetric type, and a holographic type according to methods of realizing a 3D image.

An autostereoscopic display device that is realized by the multi-view binocular disparity type may enable a viewer to feel a binocular disparity without particular glasses so as to realize a 3D image. The autostereoscopic display device may include a parallax barrier or a lenticular lens that is installed in front of or in the rear of a display panel to divide pixels that are seen by left and right eyes of the viewer.

A parallax barrier type is classified into a front barrier type where a parallax barrier is positioned between a display panel and a viewer and a rear barrier type where the parallax barrier is positioned between a light source unit and the display panel.

A rear barrier type includes a display panel that displays information of two vision fields, a parallax barrier that is disposed at a distance from the display panel, and a backlight unit (BLU) that supplies light to the parallax barrier. The parallax barrier has a structure in which stripes having light-passing units are inclined. In this structure, the number of views increases with increases in widths between the stripes, but resolutions of the views are lowered by a resolution of an original image and/or the number of views.

A barrier type 2D/3D conversion system has a structure that blocks light and thereby lowers a luminance thereof. In particular, the barrier type 2D/3D conversion system increases the luminance in proportion to the number of views in a multi-view structure. A backlight type autostereoscopic 3D system is provided to have a structure, where a 3D backlight of a line light source is stacked on a 2D backlight of a surface light source, as a structure for improving a luminance lowering problem of a 2D/3D conversion barrier type. However, when a 3D BLU supplies light for a 3D mode, leakage light is generated. This leakage light penetrates into a 2D BLU to be reflected toward a viewer. The leakage light lowers a quality of a 3D image and increases cross-talk. Also, the 2D and 3D backlights are stacked, such that a display device may not realize a compact structure.

SUMMARY

Exemplary embodiments address at least the above problems and/or disadvantages and other disadvantages not described above. Also, one or more exemplary embodiments are not required to overcome the disadvantages described above, and an exemplary embodiment may not overcome any of the problems described above.

Aspects of one or more exemplary embodiments provide a display device that increases a resolution.

Aspects of one or more exemplar embodiments provide a display device that may increase a resolution, increase a viewing zone, and adjust a light path to convert a two-dimensional (2D) image into a three-dimensional (3D) image and reduce a gap between a display panel and a backlight unit (BLU), and a method of controlling the same.

According to an aspect of an exemplary embodiment, there is provided a display device including: a display panel comprising a plurality of pixels, each of which comprises a plurality of sub pixels; a prism panel at one side of the display panel and comprising a prism array and a liquid crystal; a prism panel driver configured to apply voltage to the prism panel; and a controller configured to display a plurality of image frames on the display panel and to control a driving state of the prism panel variably while the plurality of image frames is displayed.

The controller is configured to divide an image frame into the plurality of image frames based on a number of the sub pixels comprised in each of the plurality of pixels, to control the display panel to shift and display sub pixel values for each of the plurality of sub pixels, to control the display panel to shift and display sub pixel values for each of the plurality of image frames, and to control the prism panel driver to drive the prism panel so that a voltage of variable level is applied to the prism panel while the sub pixel values are shifted and displayed.

Each of the plurality of pixels comprises red (R), green (G), and blue (B) sub pixels, and the image frame is divided into a first image frame, a second image frame, and a third image frame.

The controller, in response to a first level voltage applied to the prism panel positioned in a front direction of the display panel and light emitted from the display panel refracted with a first refraction angle by the prism panel, is configured to control to display a sub pixel value with respect to the first image frame on a first sub pixel corresponding to the first refraction angle, to control to display a sub pixel value with respect to the second image frame on a second sub pixel corresponding to the first refraction angle, and to control to display a sub pixel value with respect to the third image frame on a third sub pixel corresponding to the first refraction angle.

The controller, in response to a second level voltage applied to the prism panel positioned in the front direction of the display panel and the light emitted from the display panel refracted with a second refraction angle by the prism panel, is configured to control to display a sub pixel value with respect to the first image frame on a fourth sub pixel corresponding to the second refraction angle, to control to display a sub pixel value with respect to the second image frame on a fifth sub pixel corresponding to the second refraction angle, and to control to display a sub pixel value with respect to the third image frame on a sixth sub pixel corresponding to the second refraction angle.

The controller, in response to a third level voltage applied to the prism panel positioned in the front direction of the display panel and the light emitted from the display panel refracted with a third refraction angle by the prism panel, is configured to control to display a sub pixel value with respect to the first image frame on a seventh sub pixel corresponding to the third refraction angle, to control to display a sub pixel value with respect to the second image frame on an eighth sub pixel corresponding to the third refraction angle, and to control to display a sub pixel value with respect to the third image frame on a ninth sub pixel corresponding to the third refraction angle.

The first sub pixel, the second sub pixel, and the third sub pixel are R, G, and B sub pixels, respectively; the fourth sub pixel, the fifth sub pixel, and the sixth sub pixel are G, B, and R sub pixels, respectively; and the seventh sub pixel, the eighth sub pixel, and the ninth sub pixel are B, R, and G sub pixels, respectively.

The prism panel is on a rear side of the display panel; the display device further comprises a rod source pattern spaced apart from the prism array by a preset interval, disposed on an upper surface of a right source part, and having a pattern part and a non-pattern part alternating in a preset interval; and the controller is configured to sequentially display a plurality of multi-view images on the display panel during one image frame, and to control a driving state of the prism panel while the plurality of multi-view images are sequentially provided so that light provided from the light source part is emitted to different areas of the display panel.

The display panel is configured to be synchronized with a voltage that is applied to the prism panel and to display m number of sequential multi-view images; and the pattern part and the non-pattern part are disposed with a width of 1:n−1, where n is an integer greater than or equal to three, is a number of optical views, and satisfies m≤n.

The controller, in an mth section from one image frame section, is configured to apply to the prism panel an mth state voltage so that light passed from at least a part of the pattern part is refracted from the prism panel and is emitted to the m sub pixel area adjacent to an m−1 sub pixel to form an optical view on the preset viewing area.

According to an aspect of another exemplary embodiment, there is provided a method of controlling a display device that includes a display panel comprising a plurality of pixels each of which includes a plurality of sub pixels, and a prism panel at one side of the display panel and comprising a prism array and a liquid crystal, the method comprising: displaying a plurality of image frames on the display panel; and controlling a driving state of the prism panel variably while the plurality of image frames are displayed.

The displaying comprises dividing an image frame into the plurality of image frames based on a number of the sub pixels included in each of the plurality of pixels, and shifting and displaying sub pixel values for each of the plurality of sub pixels; and the controlling comprises controlling so that a voltage of variable level is applied to the prism panel while the sub pixel values are shifted and displayed.

Each of the plurality of pixels comprises red (R), green (G), and blue (B) sub pixels, and the image frame is divided into a first image frame, a second image frame, and a third image frame.

The displaying comprises, in response to a first level voltage applied to the prism panel positioned in a front direction of the display panel and light emitted from the display panel refracted with a first refraction angle by the prism panel: displaying a sub pixel value with respect to the first image frame on a first sub pixel corresponding to the first refraction angle; displaying a sub pixel value with respect to the second image frame on a second sub pixel corresponding to the first refraction angle; and displaying a sub pixel value with respect to the third image frame on a third sub pixel corresponding to the first refraction angle.

The displaying comprises, in response to a second level voltage applied to the prism panel positioned in the front direction of the display panel and the light emitted from the display panel refracted with a second refraction angle by the prism panel: displaying a sub pixel value with respect to the first image frame on a fourth sub pixel corresponding to the second refraction angle; displaying a sub pixel value with respect to the second image frame on a fifth sub pixel corresponding to the second refraction angle; and displaying a sub pixel value with respect to the third image frame on a sixth sub pixel corresponding to the second refraction angle.

The displaying comprises, in response to a third level voltage applied to the prism panel positioned in the front direction of the display panel and the light emitted from the display panel refracted with a third refraction angle by the prism panel: displaying a sub pixel value with respect to the first image frame on a seventh sub pixel corresponding to the third refraction angle; displaying a sub pixel value with respect to the second image frame on an eighth sub pixel corresponding to the third refraction angle; and displaying a sub pixel value with respect to the third image frame on a ninth sub pixel corresponding to the third refraction angle.

The first sub pixel, the second sub pixel, and the third sub pixel are R, G, and B sub pixels, respectively; the fourth sub pixel, the fifth sub pixel, and the sixth sub pixel are G, B, and R sub pixels, respectively; and the seventh sub pixel, the eighth sub pixel, and the ninth sub pixel are B, R, and G sub pixels, respectively.

The prism panel is on a rear side of the display panel; the display device further comprises a rod source pattern spaced apart from the prism array by a preset interval, disposed on an upper surface of a right source part, and having a pattern part and a non-pattern part alternating in a preset interval; the displaying comprises sequentially displaying a plurality of multi-view images on the display panel during one image frame; and the controlling comprises controlling a driving state of the prism panel while the plurality of multi-view images are sequentially provided so that light provided from the light source part is emitted to different areas of the display panel.

The display panel is synchronized with voltage that is applied to the prism panel and displays m number of sequential multi-view images; and the pattern part and the non-pattern part are disposed with a width of 1:n−1, where n is an integer greater than or equal to three, is a number of optical views, and satisfies m≤n.

The controlling further comprises, in an mth section from one image frame section, applying to the prism panel an mth state voltage so that light passed from at least a part of the pattern part is refracted from the prism panel and is emitted to the m sub pixel area adjacent to an m−1 sub pixel to form an optical view on the preset viewing area.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
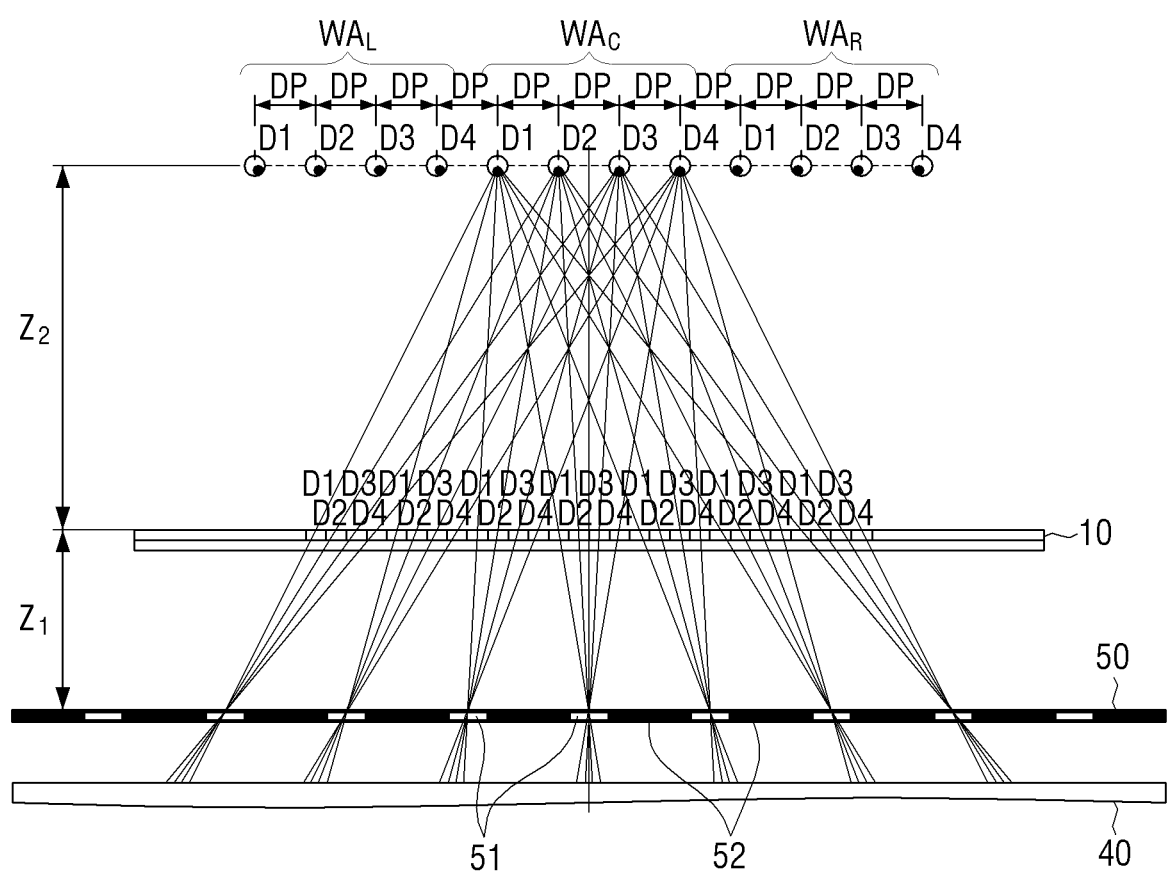
FIG. 1 is a view illustrating an operation of a display device according to an exemplary embodiment.

Exemplary embodiments are described in greater detail with reference to the accompanying drawings.

Exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters.

Hereinafter, it is understood that expressions such as "at least one of," when preceding a list of elements, modify the entire list of elements and do not modify the individual elements of the list.

FIG. 1 is a view illustrating an operation of a display device according to an exemplary embodiment.

FIG. 1 illustrates an operation method of the multi-view display device that displays a multi-view image to provide a three-dimensional (3D) image by using an autostereoscopic method, which does not require particular glasses to be worn by the user to obtain a perception of depth. Here, the multi-view image may be generated based on a plurality of images that are acquired by capturing an object at different angles. In other words, a plurality of images are captured from different views and refracted at different angles to provide an image that is focused in a position keeping a distance called a viewing distance. A position where such an image is formed is referred to as a viewing zone (or an optical view). Therefore, if one eye of a user is positioned in one viewing zone, and the other eye of the user is positioned in a second viewing zone, the user may feel or perceive a 3D effect.

For example, FIG. 1 illustrates a display operation of a multi-view image having a total of four views (optical views). Referring to FIG. 1, an autostereoscopic 3D display device includes a light source unit 40 (e.g., light source), a parallax barrier 50 that is disposed on an upper surface of the light source unit 40 and includes a light-passing unit 51 (e.g., light passer) and a light-blocking unit 52 (e.g., light blocker), and a display panel 10 that is disposed at a preset distance Z1 above an upper surface of the parallax barrier 50. Images D1, D2, D3, and D4 having four views (optical views) are sequentially disposed on the display panel 10 and projected by light passing through the parallax barrier 50 so as to have 4 views (optical views) in a central vision field. Therefore, a viewer who is at a preset distance Z2 from the display panel 10 disposes left and right eyes in two of four views (optical views) to feel a 3D effect. A barrier type in which the parallax barrier 50 is disposed between the light source unit 40 and the display panel 10, as illustrated in FIG. 1, is referred to as a rear barrier type. The rear barrier type shown in FIG. 1 may include a line light source pattern light guide plate where pattern parts and non-pattern parts alternate at preset intervals, according to an exemplary embodiment.

Figure 2:
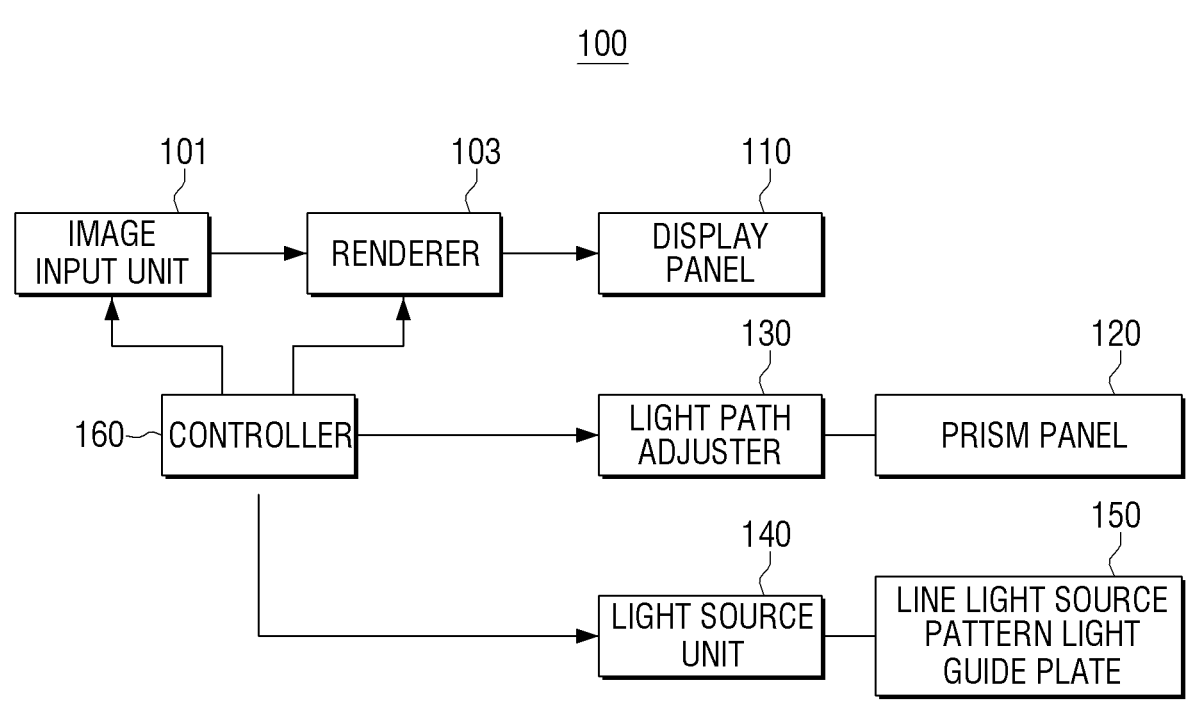
FIG. 2 is a block diagram illustrating a structure of a display device and a method of controlling the multi-view display device, according to an exemplary embodiment.

FIG. 2 is a view illustrating a structure of a multi-view display device 100 according to an exemplary embodiment.

Figure 4A:
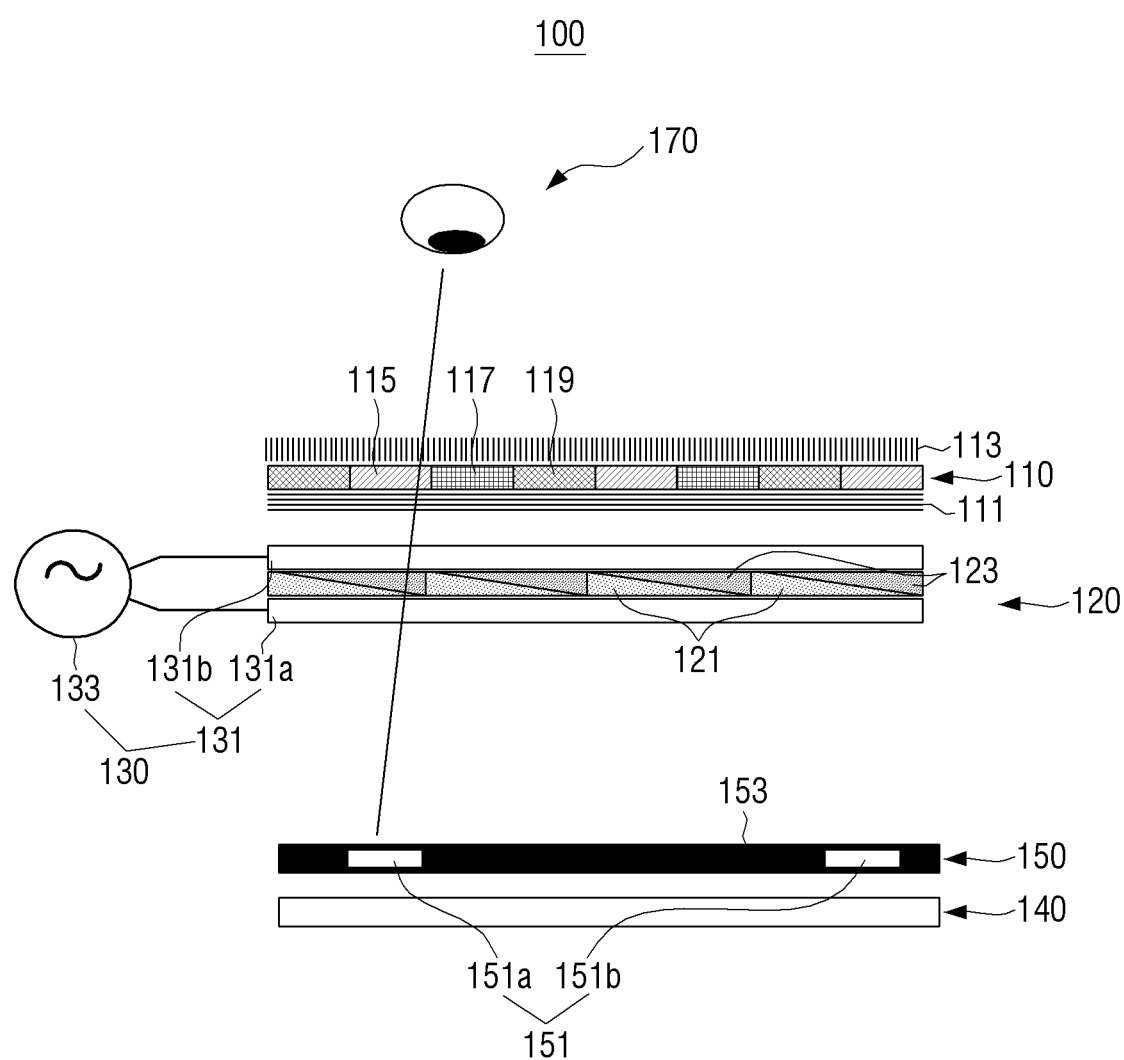
FIGS. 4A through 4C are views illustrating a structure of the display device of FIG. 2.

FIG. 2 is a block diagram illustrating the structure of the display device 100. FIG. 4A is a view illustrating a zero state of the display device 100.

Referring to FIG. 2, the display device 100 includes an image input unit 101 (e.g., image input device and image inputter), a renderer 103, a display panel 110, a prism panel 120, a light path adjuster 130, a light source unit 140 (e.g., light source), a line light source pattern light guide plate 150, a controller 160, and an optical view 170. One or more of the elements illustrated in FIG. 2 may be omitted or changed, or another element may be further included.

The display device 100 may be realized as various types of display devices such as a television (TV), a monitor, an electronic frame, a mobile device, etc.

The image input unit 101 receives an image. In detail, the image input unit 101 may receive the image from various types of external devices such as an external storage medium, a broadcasting station, etc. Here, the image is a single view image, a stereo image, or a multi-view image. The single view image is an image that is captured by a general photographing apparatus. The stereo image is a 3D image that is expressed with only left and right images and captured by a photographing apparatus including two lenses. The multi-view image refers to a multi-view image that is acquired by geometrically correcting and spatially synthesizing images captured through one or more photographing apparatuses to provide a viewer with various optical views of several directions of an object.

The image input unit 101 may receive depth information of the image. In general, a depth refers to a depth value given to each pixel of the image. By way of example, a depth of 8 bits may have a grayscale value between 0 and 255. Additionally, when the image is displayed based on black and/or white, a black color (a low value) denotes a place that is far away from the viewer, and a white color (a high value) denotes a place that is close to the viewer.

The depth information is information that indicates a depth of a 3D image and corresponds to a binocular disparity between left and right images forming the 3D image. A 3D effect a human feels varies according to depth information. In other words, if a depth is large, a binocular disparity is high, and thus a 3D effect is felt relatively great. If the depth is small, the binocular disparity is low, and thus the 3D effect is felt relatively small.

The renderer 103 may render a plurality of different views. In detail, the renderer 103 may render a plurality of different optical views of a 2D image based on depth information extracted from a 2D/3D conversion. Alternatively, if N pieces of depth information corresponding to N different views are input, the renderer 103 may render a multi-view image based on at least one image and at least one piece of depth information selected from the N different views and the N pieces of depth information. Alternatively, if N different views are input (e.g., without separate depth information), the renderer 103 may extract or determine depth information from the N different views and render a multi-view image based on the extracted depth information.

The display panel 110 includes a plurality of pixels each having a plurality of sub pixels. Here, a pixel may include red (R), green (G), and blue (B) sub pixels. In other words, pixels each having R, G, and B sub pixels may be arrayed in a plurality of rows and a plurality of columns to form the display panel 110. In this case, the display panel 110 may be realized as various types of display units such as a liquid crystal display (LCD) panel, a plasma display panel (PDP), an organic light-emitting diode (OLED) display panel, an active matrix OLED (AMOLED) display panel, etc.

The display panel 110 displays an image frame. In detail, the display panel 110 may display a multi-view image frame where a plurality of different views are sequentially and repeatedly arrayed.

In the present exemplary embodiment, if the display panel 110 is realized as an LCD panel, the display panel 110 may further include a first polarizer 111 that is disposed on a lower surface of the display panel 110 and a second polarizer 113 that is disposed on an upper surface of the display panel 110.

The first polarizer 111 transmits only a component of a preset first polarization direction of irradiated light and absorbs a component that is not of the first polarization direction. The second polarizer 113 transmits only a component of a preset second polarization direction of the irradiated light passing through the display panel 110 and absorbs a component that is not of the second polarization direction.

Here, the second polarization direction is different from the first polarization direction, e.g., the second polarization direction is perpendicular to the first polarization direction. This is because the irradiated light passes through a liquid crystal layer so as to enable a polarization direction of the irradiated light to be rotated 90 degrees. If the second polarizer 113 transmits a light component of a first polarization direction like the first polarizer 111, irradiated light of a first polarization direction passing through the first polarizer 111 passes through the liquid crystal layer to be adjusted into a second polarization direction. Therefore, the irradiated light of the first polarization direction may not pass through the second polarizer 113. Therefore, a polarization direction of light penetrating through the second polarizer 113 may be configured to be perpendicular to a polarization direction of light penetrating through the first polarizer 111.

The display panel 110 has been described above as being realized as the LCD panel. According to another exemplary embodiment, the display panel 110 may be realized as an OLED display panel that sequentially displays a plurality of multi-view images and increases a resolution to two or more times through the light path adjuster 130 that differently changes paths of lights when sequentially providing a plurality of multi-view images.

The prism panel 120 refracts light. The prism panel 120 is disposed on a rear surface of the display panel 110 and includes a first prism array 121 that has prisms and a second prism array 123 that is stacked on the first prism array 121.

The first prism array 121 may be formed of an optically transparent material, and a refractive index of the first prism array 121 may be set to "$n_p(=n_e)$". In the present exemplary embodiment, the first prism array 121 may have a saw-edged cross-section, i.e., a right-angled triangular cross-section, and a height of each prism constituting the first prism array 121 may be 3-5 μm or less. According to the present exemplary embodiment, the first prism array 121 is used to increase a resolution m times in a multi-view image. The viewer may see one real stripe and two virtual stripes, which are sequentially displayed, through a prism having an isosceles triangular shape. Therefore, the first prism array 121 may include right-angled triangular prisms to increase a resolution by two or more times.

The second prism array 123 is a liquid crystal layer and stacked on the first prism array 121. A liquid crystal is an anisotropic material having two types of refractive indexes including an ordinary refractive index "no" and an extra-ordinary refractive index "ne", and has a greater value than the extra-ordinary refractive index "ne" and the ordinary refractive index "no". That is, liquid crystal may have a refractive index of $\Delta n(=n_e \sim n_o)$.

The light path adjuster 130 adjusts a path of light passing through the prism panel 120. In the present exemplary embodiment, the light path adjuster 130 converts an applied voltage into an analog type and applies a voltage difference to the liquid crystal to change a refractive index of the liquid crystal so as to adjust a path of light.

The light path adjuster 130 includes a transparent electrode 131 and a voltage applier 133.

The transparent electrode 131 includes a first transparent electrode 131a that is disposed on a lower surface of the first prism array 121 and a second transparent electrode 131b that is disposed on an upper surface of the second prism array 123.

The voltage applier 133 applies a voltage difference between 0 and a preset value to the transparent electrode 131. In other words, the voltage applier 133 drives in an analog method.

In the meantime, a propagation direction of light that passes through the prism panel 120 according to voltage applied to the transparent electrode 131 may be determined.

Figure 3:
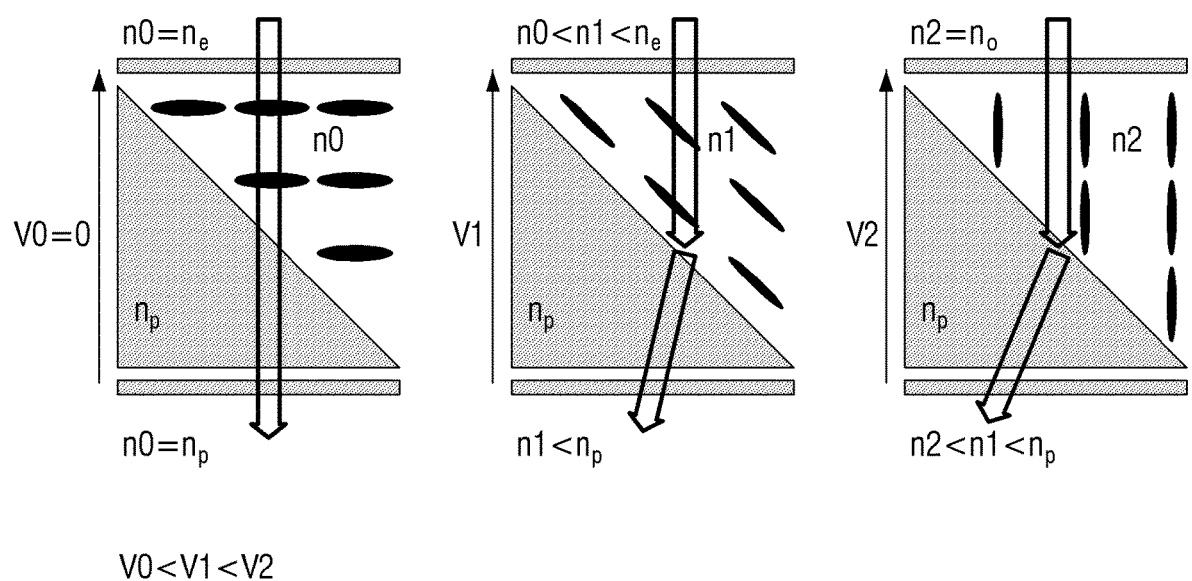
FIG. 3 is a view illustrating refraction of light according to an exemplary embodiment.

For example, with reference to FIG. 3, by the voltage applied to the transparent electrode 131, when a voltage difference of $V_0=0[V]$ is generated from the transparent electrode 131, the effective refractive index of liquid crystal with respect to linear polarization is $n_0$. In this case, the refractive index of liquid crystal is the same as the refractive index $n_p$ of the first prism array 121. Accordingly, the propagation direction of light that passes through the prism panel 120 does not change.

In addition, by voltage applied to the transparent electrode 131, when a voltage difference of $V_1(V_1>V_0)$ is generated from the transparent electrode 131, the effective refractive index with respect to linear polarization is $n_1(n_o<n_1<n_0)$. In this case, $n_1<n_p$, and thus, incident light of the prism panel 120 may be refracted on an inclined plane of a prism. The refractive angle may be determined based on a difference between the effective refractive index of liquid crystal and the refractive index of a prism.

In addition, by the voltage applied to the transparent electrode 131, when a voltage difference of $V_2(V_2>V_1)$ is generated from the transparent electrode 131, the effective refractive index with respect to linear polarization is $n_2(n_2=n_o)$. In this case, $n_2$ is the maximum value of $n_o$. Accordingly, light admitted to the prism panel 120 may be refracted on an inclination plane of the prism as much as the maximum refractive angle.

In the meantime, the present exemplary embodiment illustrates that the light path adjuster 130 includes the transparent electrode 131, but this is merely exemplary. The transparent electrode 131 is a mechanism for applying voltage applied from the voltage applier 133 to the prism array 121, 123, and in this regard, it may be seen that the prism panel 120 includes the first prism array 121, the second prism array 123, and the transparent electrode 131, and the light path adjuster 130 includes the voltage applier 133. In this case, the light path adjuster 130 performs a function to apply voltage to the prism panel 120.

The light source unit 140 may be a backlight unit (BLU) that provides light to the display panel 110. Through the light provided from the light source unit 140, light projected by the line light source pattern light guide plate 150 diffuses images formed on the display panel 110 to transmit the diffused images to the viewer. The light source unit 140 is disposed on a rear surface of the line light source pattern light guide plate 150.

The light source unit 140 supplies a driving voltage to light sources (e.g., light emitting diodes) to turn on the light sources under control of the controller 160. The light source unit 140 alternately or simultaneously turns on the light sources in a 2D mode by using a mode such as a 3D mode. The light source unit 140 synchronizes with the display panel 110 and the light path adjuster 130 in the 3D mode to alternately turn on the light sources.

The line light source pattern light guide plate 150 is a vision filed divider. The line light source pattern light guide plate 150 is realized as a pattern that operates as a plurality of line light sources. The line light source pattern light guide plate 150 may include pattern parts 151 and non-pattern parts 153, which alternate, to emit an image having different views. Here, the pattern parts 151 pass light, and the non-pattern parts 153 do not pass light.

The line light source pattern light guide plate 150 may incline at a preset angle to operate so as to improve an image quality. In this case, the controller 160 may generate a multi-view image frame that is to divide, combine, and output the plurality of views rendered by the renderer 103 based on the preset angle at which the line light source pattern light guide plate 150 inclines. Therefore, the viewer may view an area inclining in a particular direction and not an image that is vertically or horizontally displayed on a sub pixel of the display panel 110. According to this method, the viewer may view a part of each sub pixel, and not one complete sub pixel. The line light source pattern light guide plate 150 inclines at the preset angle in the present exemplary embodiment, but may not incline in one or more other exemplary embodiments.

As gaps between pattern parts of the line light source pattern light guide plate 150 are great, the number of views (optical views) increases. However, since images of several views (optical views) are spatially and appropriately divided and arrayed on one display panel 110, a resolution is lowered by the number of provided views (optical views). For example, if the number of views (optical views) is n, the pattern parts 151 and the non-pattern parts 153 may be arrayed at 1:n−1. If n is seven, the pattern parts 151 and the non-pattern parts 153 alternate in a width of 1:6, and a resolution of each view (each optical view) is ⅐ of a resolution of an original image.

The controller 160 controls an overall operation of the display device 100. To do this, the controller 160 may include a central processing unit (CPU), a random access memory (RAM), and read only memory (ROM) for operations of the display device 100.

In particular, the controller 160 may display a plurality of image frames on the display panel 110, and control an operation state of the prism panel 120 to be different while an image frame is displayed.

To do this, the controller 160 generates a multi-view image that is to be displayed on the display panel, based on a sub pixel value constituting a plurality of different optical views rendered by the renderer 103.

The controller 160 also sequentially displays a plurality of multi-view images on the display panel 110 for one image frame period. In other words, the controller 160 controls the plurality of multi-view images to be respectively provided in different pixel areas. Therefore, the controller 160 controls the display panel 110 to sequentially display the plurality of multi-view images by using a time division method. For example, when the controller 160 drives the multi-view display device 100 as if images of six states (i.e., m is six or images of six views) are simultaneously formed in a retina of each optical view, the controller 160 may set a frame rate, at which one frame image is sequentially displayed as images of six states, to about 30 Hz. In this case, a time interval corresponding to each state may be adjusted to 0.0055 (=(1/30)*(⅙)) seconds, and thus the viewer may hardly feel a parallax between images of six states that are displayed but may experience a six-fold increase in a resolution.

When multi-view images are sequentially provided, the controller 160 differently controls a driving state of the light path adjuster 130 so as to differently change a path of light that is provided from the light source unit 140 to the prism panel 120. Therefore, the controller 160 controls the light provided from the light source unit 140 to be irradiated onto different pixel areas of the display panel 110.

In detail, the controller 160 synchronizes the display panel 110 and the light path adjuster 130 to adjust a path of light so as to enable the path of the light to correspond to a displayed field state. Therefore, when the path of the light is differently changed, the light path adjuster 130 forms at least one virtual pattern part between the pattern part 151*a* and another pattern part 151*b* adjacent to the pattern part 151*a*. In other words, when fields are respectively sequentially displayed, the controller 160 may drive the light path adjuster 130 to adjust a light path so as to enable a virtual pattern part to emit light and enable the light to pass through a corresponding sub pixel of each field. However, the virtual pattern part is provided here for convenience of description, and it is understood that light is actually provided not from the virtual pattern part, but from the pattern part 151 so as to enable a refractive index of the light to be adjusted. The light having the refractive index adjusted by the light path adjuster 130 passes through the prism panel 120 and then is sequentially irradiated onto different pixel areas of the display panel 110.

The optical view 170 refers to a plurality of views positioned in a viewing zone in the display device 100. If left and right eyes are positioned in two optical views 170, the viewer may feel a stereoscopic effect.

Figure 4B:
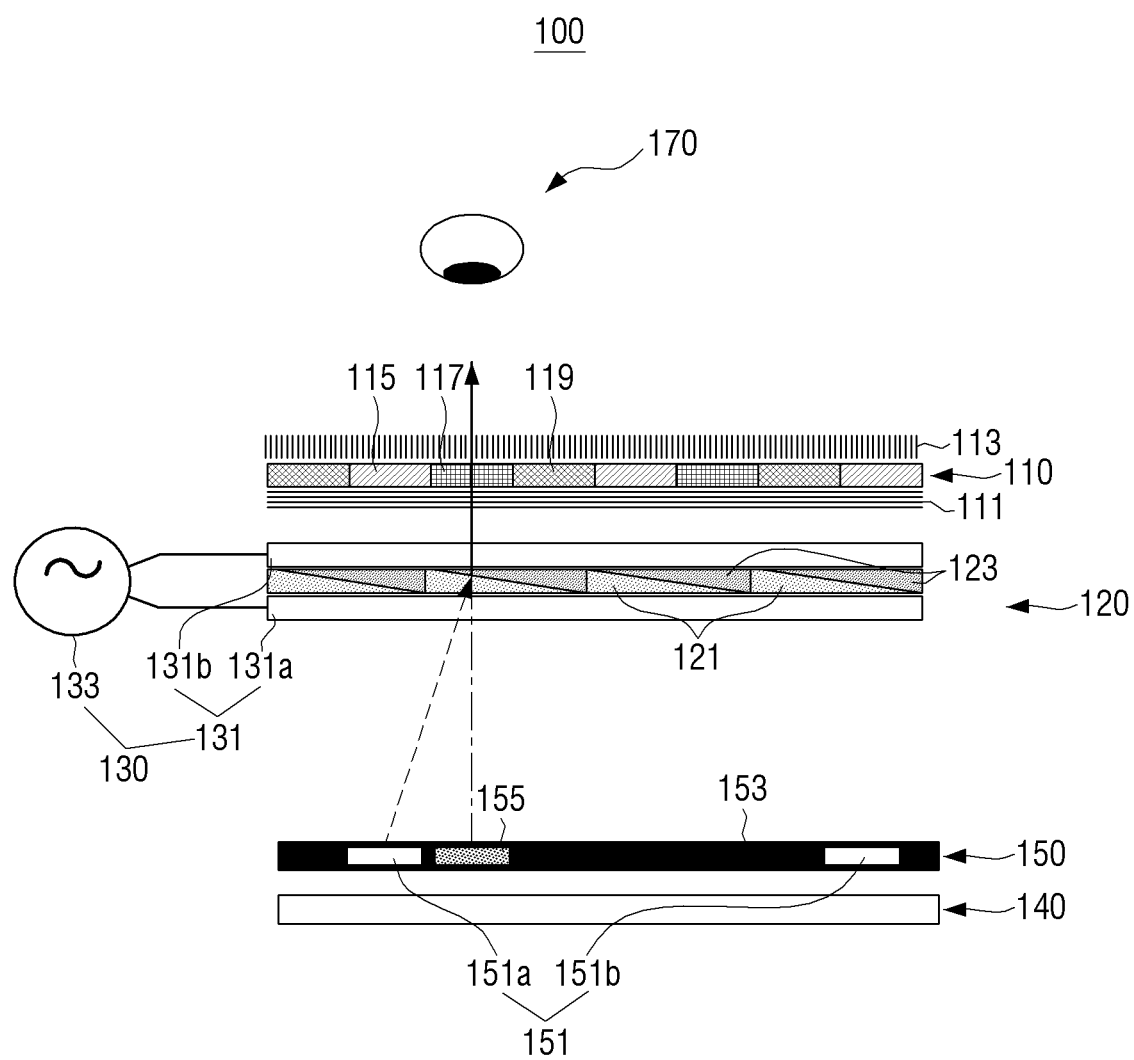
Figure 4C:
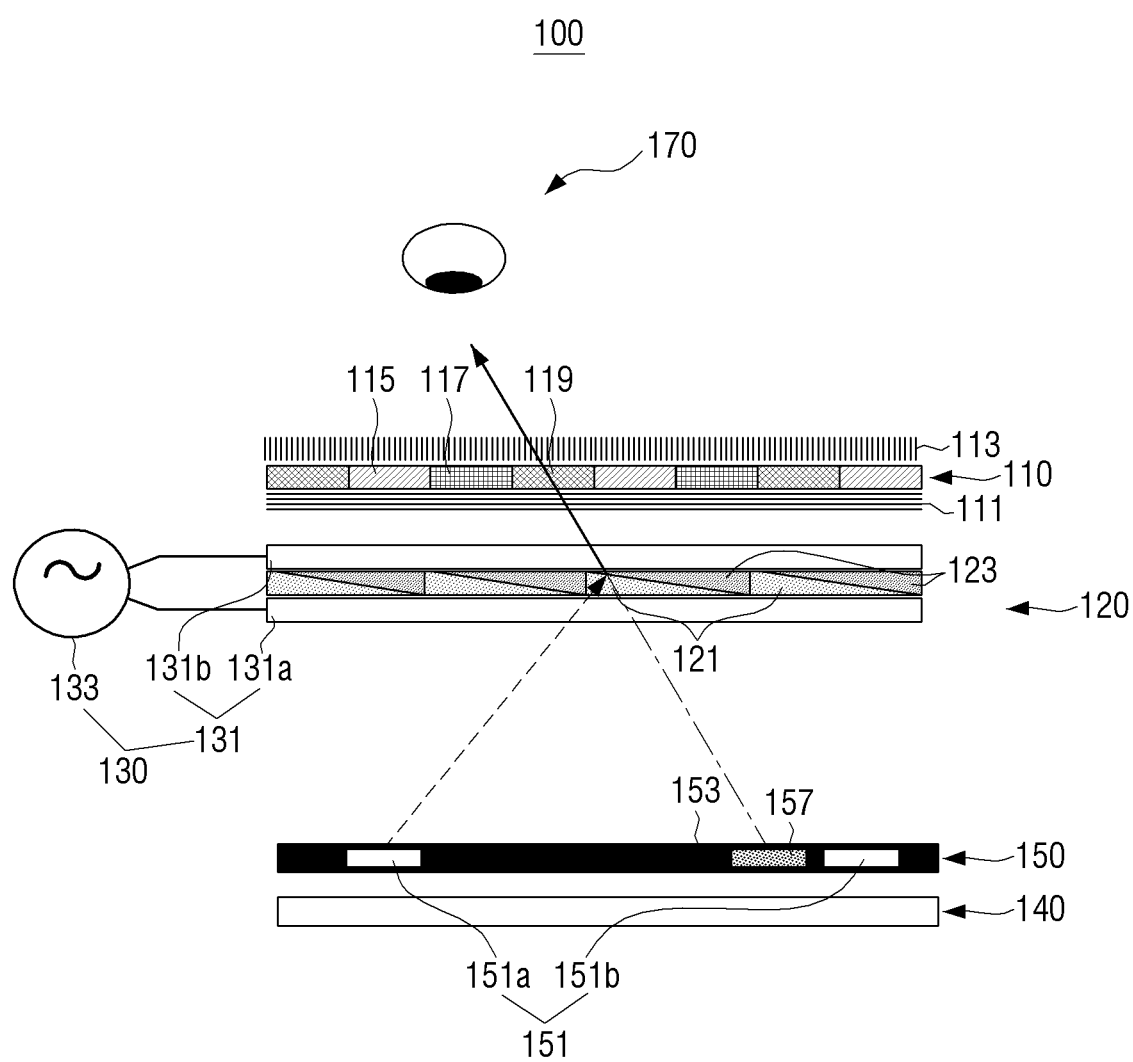

FIGS. 4A through 4C are views illustrating a structure and an operation of the display device 100, according to an exemplary embodiment. The operation of the display device 100 will now be described in detail with reference to FIGS. 4A through 4C.

The controller 160 applies an analog voltage to the light path adjuster 130 to apply a voltage difference to the first and second transparent electrodes 131*a* and 131*b*. For convenience of description, FIGS. 4A and 4B illustrate light that goes straight or is refracted between one of multi-views, one pattern part 151, and another pattern part 151*b* adjacent to the one pattern part 151. First through $m^{th}$ time intervals correspond to time intervals into which one image frame period is divided.

FIG. 4A illustrates a first state of the light path adjuster 130. The controller 160 applies a voltage to enable a voltage difference between the electrodes 131 to be 0 for a first time interval T1 of one image frame period. Therefore, the controller 160 controls light to go straight from one pattern part 151*a* and then to be irradiated onto a first sub pixel area 115 so as to form an optical view in a preset viewing zone.

In this case, a refractive index of a liquid crystal of the second prism array 123 may be designed to be "$n_e$". Therefore, the refractive index "$n_e$" of the second prism array 123 is equal to the refractive index "$n_e$" of the first prism array 121, and thus light is not refracted but goes straight. In other words, light that passes through the pattern part 151*a* is not refracted but goes straight, and the display panel 110 displays an image corresponding to the first sub pixel 115. Therefore, the viewer may see an image corresponding to the first sub pixel 115.

FIG. 4B illustrates a second state of the light path adjuster 130. The controller 160 applies a second state voltage to the electrode 131 for a second time interval T2 of the one image frame period to enable light passing through one real pattern part 151*a* to be refracted by the prism panel 120 and then to be irradiated onto a second sub pixel 117 adjacent to the first sub pixel 115 so as to form an optical view in the preset viewing zone.

In other words, if a voltage difference between the electrodes 131 is ΔV1 by the light path adjuster 130 for the second time interval T2, a difference between refractive indexes of the first and second prism arrays 111 and 113 is Δn1. Therefore, light is refracted by the refractive index difference of Δn1. As a result, light that is generated by the real pattern part 151*a* is refracted by the refractive angle corresponding to the refractive index difference of Δn1 and then irradiated onto the display panel 110, and the viewer sees an image corresponding to the second sub pixel 117. In other words, the viewer may recognize that light goes straight from a first virtual pattern part 155 adjacent to the real pattern part 151*a*. In this case, the display panel 110 may display the image corresponding to the second sub pixel 117, and the viewer may see the image corresponding to the second sub pixel 117.

FIG. 4C illustrates an $m^{th}$ state of the light path adjuster 130. Here, m is a natural number greater than two and indicates the number of states of the light path adjuster 130. The controller 160 applies an $m^{th}$ state voltage to the electrode 131 for a $m^{th}$ time interval Tm of the one image frame period to enable light passing through one pattern part 151*a* to be refracted by the prism panel 120 and then irradiated onto an $m^{th}$ sub pixel 119 adjacent to an $m-1^{st}$ sub pixel so as to form an optical view in the preset viewing zone.

In this case, if a voltage difference between the electrodes 131 is ΔVm by the light path adjuster 130, a difference between refractive indexes of the first and second prism arrays 121 and 123 is Δnm. Therefore, light is refracted by the refractive angle corresponding to the refractive index difference of Δnm. As a result, light passing through the real pattern part 151*a* is refracted by the refractive index difference of Δnm and then irradiated onto the display panel 110, and the viewer sees an image corresponding to the $m^{th}$ sub pixel 119. In other words, the viewer may recognize that light goes straight from an $m-1^{th}$ virtual pattern part 157 adjacent to a real pattern part 151*b*. In this case, the display panel 110 may display an image corresponding to the $m^{th}$ sub pixel 119, and the viewer may see the image corresponding to the $m^{th}$ sub pixel 119.

For convenience of description, in the present exemplary embodiment, two virtual pattern parts 155 and 157 have been described as being provided. However, it is understood that one or more other exemplary embodiments are not limited thereto. For example, according to one or more other exemplary embodiments, three or more virtual pattern parts may be provided. If the light path adjuster 130 is realized in first through fourth states, i.e., m is four and three virtual pattern parts are generated between the real pattern parts 151*a* and 151*b*. In this case, a distance between centers of virtual patterns is set to ¼th of a distance between the real pattern parts 151*a* and 151*b*, i.e., a distance of the non-pattern part 153.

A maximum value of m that is a state realized by the light path adjuster 130 is n, where n is the number of views (optical views) that may be formed by a pitch between the real patterns 151*a* and 151*b*. Therefore, a resolution of each optical view may increase to a plurality of views to m/n times. For example, the number of views (optical views) is seven, and m is seven, a resolution of each optical view is equal to a resolution of an original image.

Also, if m is two in the display device 100 having seven views (optical views), a resolution of each of the optical views doubles. Therefore, although the multi-view display device 100 has 14 views (optical views) that are increased to two times, the resolution is not greatly lowered. If m is 7, and views (optical views) are increased to 14 views (optical views), the lowering of the resolution is only ½. Therefore, according to the present exemplary embodiment, lowering of a resolution may be minimized, and a vision field may be increased. An inverse stereoscopic zone corresponding to each view may be minimized with the increase in the vision field. Also, the viewer may view an image having a greater depth in a wide zone to enjoy an image that has a 3D effect and an improved quality without restriction of an eye line movement.

Furthermore, the controller 160 may drive the display panel 110 to sequentially display images including at least two adjacent unit pixels having different views in time order. Therefore, according to the present exemplary embodiment, the controller 160 may drive the display panel 110 so as to enable the viewer to feel a stereovision with one eye.

A related art 3D display device using a time division increases a resolution by using an active optical element. However, since this structure includes the active optical element and a plurality of focusing lenses, this structure may increase a thickness of a display device and thus may not be applied to a display device that is made light, thin, and compact. Also, this device includes a plurality of image projectors, and thus a structure and an operation thereof are complicated. Therefore, this device is limited to be actually realized.

However, according to the present exemplary embodiment, the line light source pattern light guide plate 150 may be disposed on a rear surface of the display panel 110 so as to reduce a thickness and a volume thereof.

If m is 2, i.e., the light path adjuster 130 sequentially provides a voltage at two different refractive indexes, a resolution of an image that is lowered by an increase in views (optical views) is doubled. In this case, the first prism array 121 may be formed or provided as an isosceles triangle.

In this case, the controller 160 alternately applies off and on voltages to the first and second transparent electrodes 131a and 131b for one image frame period. The controller 160 may also control light to be irradiated onto an even-numbered sub pixel of the display panel 110 when the off voltage is applied and control light to be irradiated onto an odd-numbered sub pixel of the display panel 110 when the on voltage is applied.

In detail, if the light path adjuster 130 is in a first state, i.e., in an off state where an applied voltage is 0, the refractive index "ne" of the second prism array 123 is equal to the refractive index "ne" of the first prism array 121. Therefore, light is not refracted so as to go straight. In other words, light passing through the real pattern part 151a may not be refracted but may go straight, and the viewer may see an image corresponding to the first sub pixel 115. In this case, the display panel 110 displays an even-numbered frame image.

If the light path adjuster 130 is in a second state, i.e., in an on state where a voltage is applied for a second time interval, a voltage difference occurs between the first and second transparent electrodes 131a and 131b, and thus light is refracted by a preset refractive index difference. Therefore, the viewer may recognize that light goes straight from two virtual pattern parts adjacent to each other on both sides of the real pattern part 151. In this case, the display panel 110 displays an odd-numbered frame image.

Even-numbered and odd-numbered images as described above may be sequentially displayed from each optical view, e.g., at a frame rate of 30 Hz. Therefore, the viewer may enjoy an image having a resolution that is increased to two times more than an image having a resolution that is lowered with an increase in the number of views.

Figure 5:
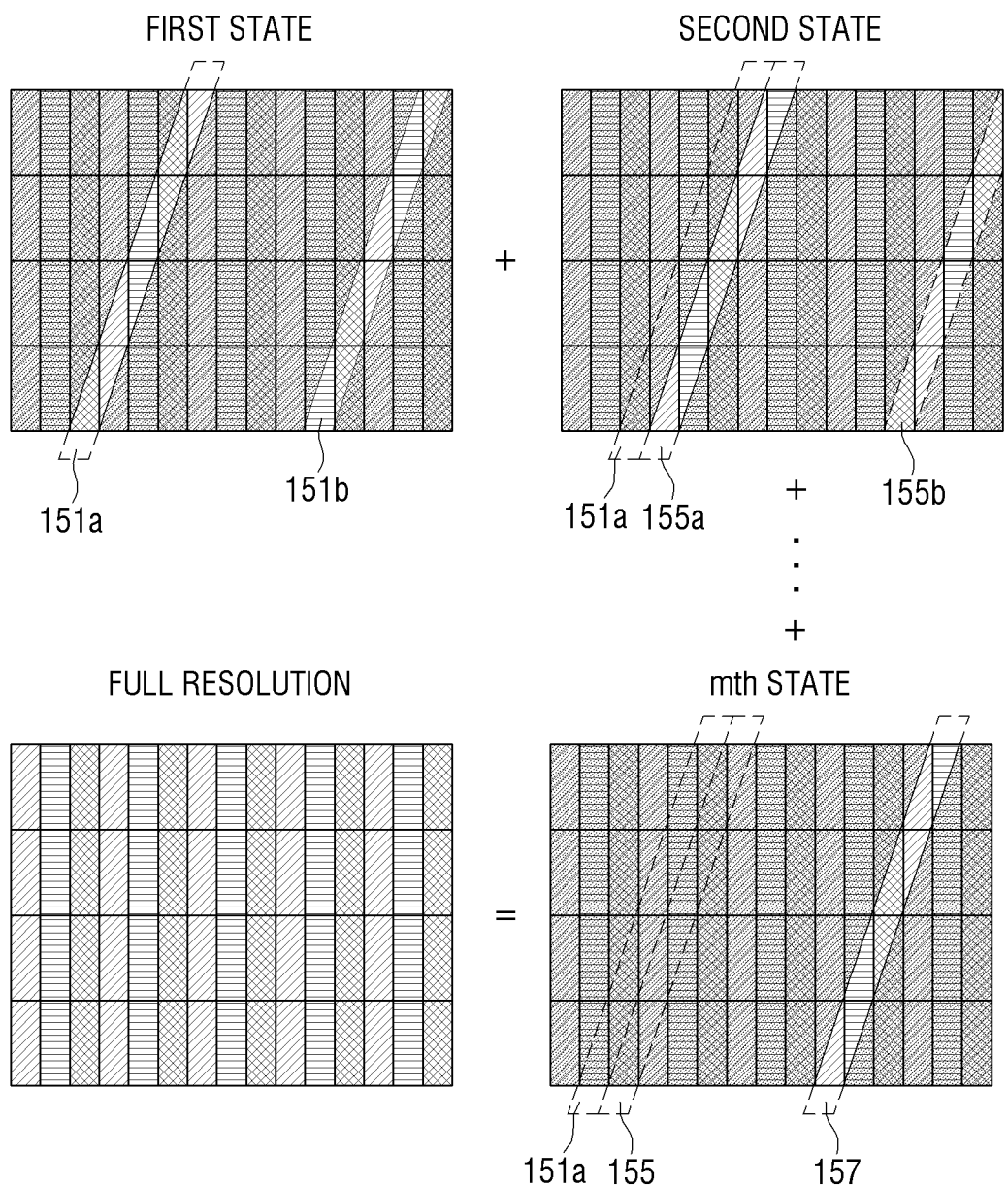
FIG. 5 is a view illustrating an increase in a resolution of the display device of FIG. 2.

FIG. 5 is a view illustrating a resolution of the display device 100 that is increased m times, according to an exemplary embodiment.

Referring to FIG. 4, the viewer sees only an image corresponding to stripes of the real pattern parts 151a and 151b for a first time interval of one image frame period for which a voltage is not applied by the light path adjuster 130. For a second time interval of the one image frame period, the viewer sees an image corresponding to stripes of the virtual pattern parts 155a and 155b that are shifted by intervals of sub pixels in the real pattern parts 151a and 151b. For an $m^{th}$ time interval of the one image frame period, the viewer sees an image corresponding to stripes of a virtual pattern part 157 that is shifted by a preset distance from the real pattern parts 151a and 151b. For the one image frame period, time sequences of intervals of first through $m^{th}$ states are completed, and the display panel 110 synchronizes with the light path adjuster 130 to sequentially display images respectively corresponding to the first through $m^{th}$ states at a preset high-speed frame rate. Therefore, the viewer may view an image having a resolution that is increased m times more than an image having a resolution that is lowered with an increase in the number of views in a multi-view image. If the number of optical views is equal to m, the viewer may view an image having the same resolution as an original image.

Figure 6:
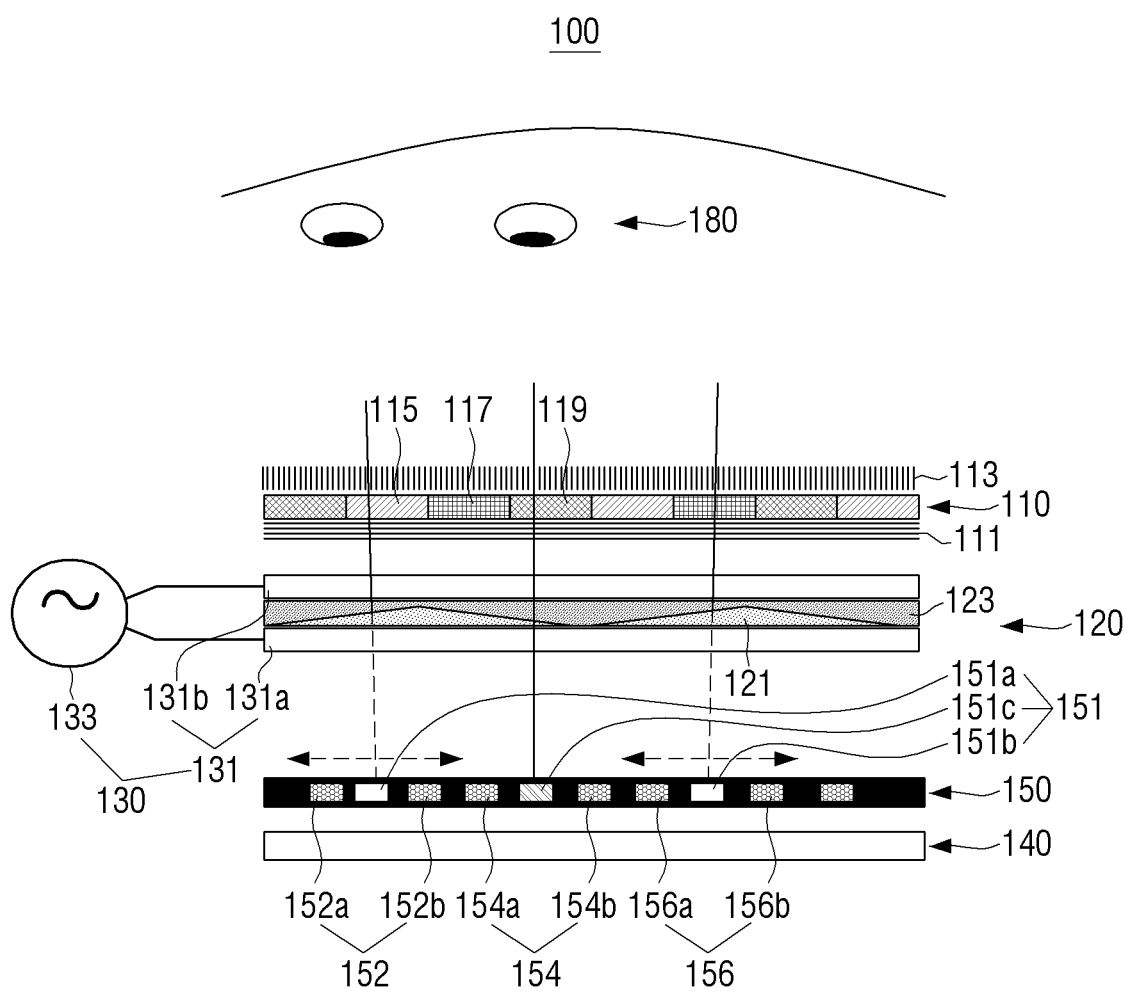
FIG. 6 is a view illustrating a display device that is changed from a 2-dimensional (2D) mode into a 3-dimensional (3D) mode and/or the 3D mode into the 2D mode, according to another exemplary embodiment.

FIG. 6 is a view illustrating a display device 100 that is changed from a 2D mode into a 3D mode or from the 3D mode into the 2D mode, according to another exemplary embodiment.

Referring to FIG. 6, most of elements of the multi-view display device 100 of the present exemplary embodiment are the same as those of elements of the multi-view display device 100 of the previous exemplary embodiment. Also, a structure of a prism panel 120 and a driving method of a light path adjuster 130 of the present exemplary embodiment are different from the structure of the prism panel 120 and the driving method of the light path adjuster 130 of the previous exemplary embodiment. The same elements of the present exemplary embodiment as those of the previous exemplary embodiments are denoted by the same reference numerals. Different elements of the present exemplary embodiment from elements of the previous exemplary embodiment will be mainly described.

In the present exemplary embodiment, the prism panel 120 includes a first prism array 121 having an isosceles triangular cross-section. A second prism array 123 that is formed as a liquid crystal may have an isosceles triangular cross-section to correspond to the first prism array 121. If the first prism array 121 has an isosceles triangular shape, virtual pattern parts 152, 154, and 156 may be respectively sequentially formed beside real pattern parts 151a, 151b, and 151c along with the real pattern parts 151a, 151b, and 151c. In the present exemplary embodiment, the first prism array 121 may be realized in a saw-edge shape. If light for a 2D mode is uniformly irradiated, a shape of the first prism array 121 may be changed.

In this case, for one image frame period, the controller 160 may control the light path adjuster 130 to operate in a 2D mode where a driving speed of the light path adjuster 130 is increased to a preset speed or more to irradiate light passing through a plurality of pattern parts onto all sub pixels of the display panel 110 so as to provide a 2D image.

In detail, the controller 160 controls the light path adjuster 130 to change a voltage applied to a transparent electrode 131 so as to change a difference of a refractive index of the second prism array 123 of the display panel 120 from 0 to a preset value. Therefore, a plurality of virtual pattern parts 152, 154, and 156 are formed, and a viewer 180 sees a constantly scanned image of a line light source pattern light guide plate 150. If a scanning speed is sufficiently high, the viewer 180 may see light that is uniformly irradiated onto a light source unit 140. Therefore, the multi-view display device 100 may be driven in the 2D mode and may be freely changed from the 2D mode to a 3D mode or from the 3D mode to the 2D mode.

The controller 160 controls the display panel 110, the light path adjuster 130, and the light source unit 140 in the 2D or 3D mode in response to a 2D/3D identification code that is extracted from a 2D/3D mode selection signal input through a user interface (UI) or from an input image signal. The controller 160 supplies digital video data having a 2D data format to a data driver circuit in the 2D mode. The controller 160 supplies 3D image data to the data driver circuit in the 3D mode.

According to the present exemplary embodiment, the multi-view display device 100 does not need to stack a 2D light source unit on the 3D light source unit 140. Therefore, the multi-view display device 100 may be made light and thin and may prevent cross-talk caused by leakage light.

Figure 7A:
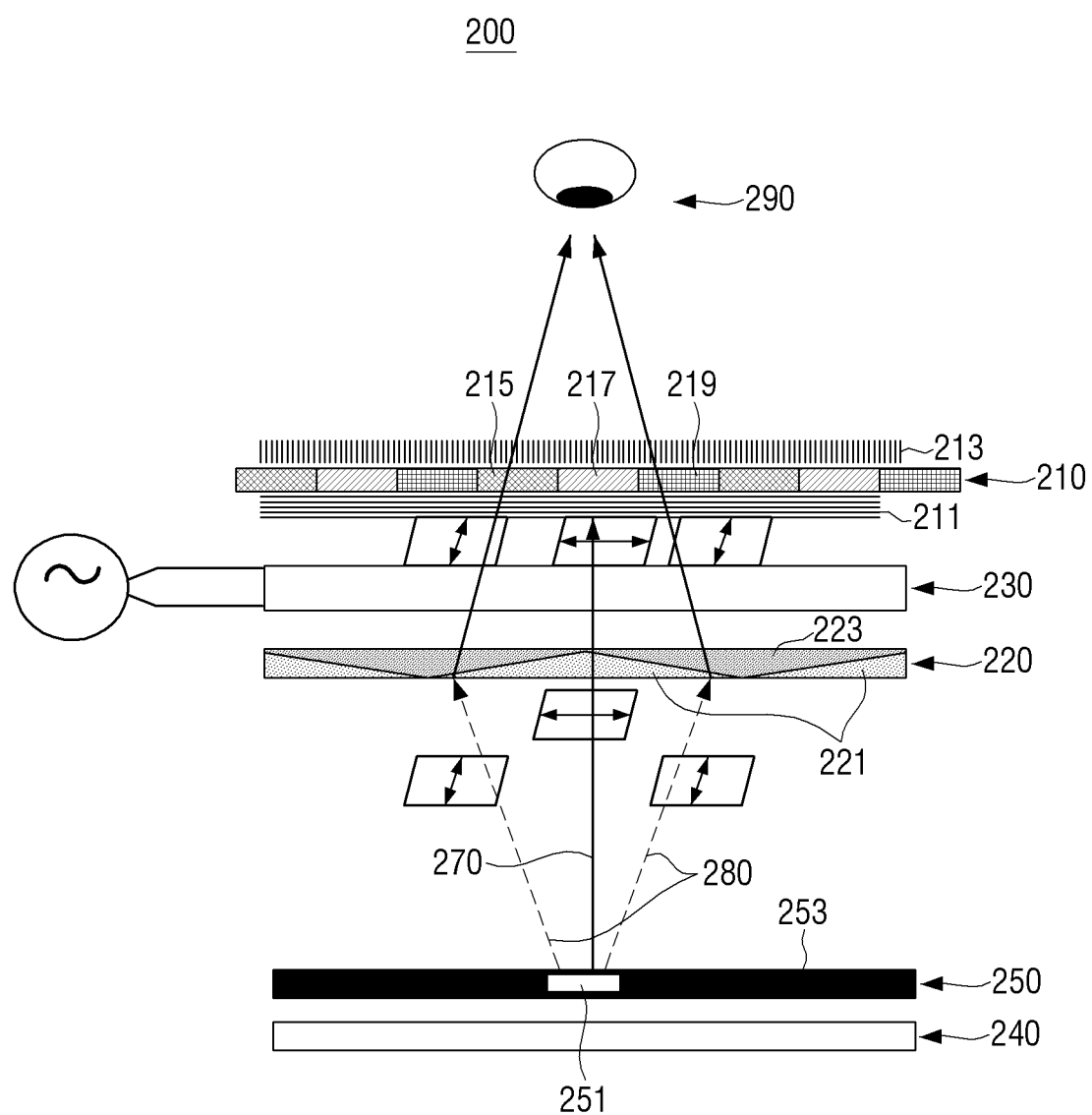
FIGS. 7A and 7B are views illustrating a structure and an operation of a display device, according to another exemplary embodiment.
Figure 7B:
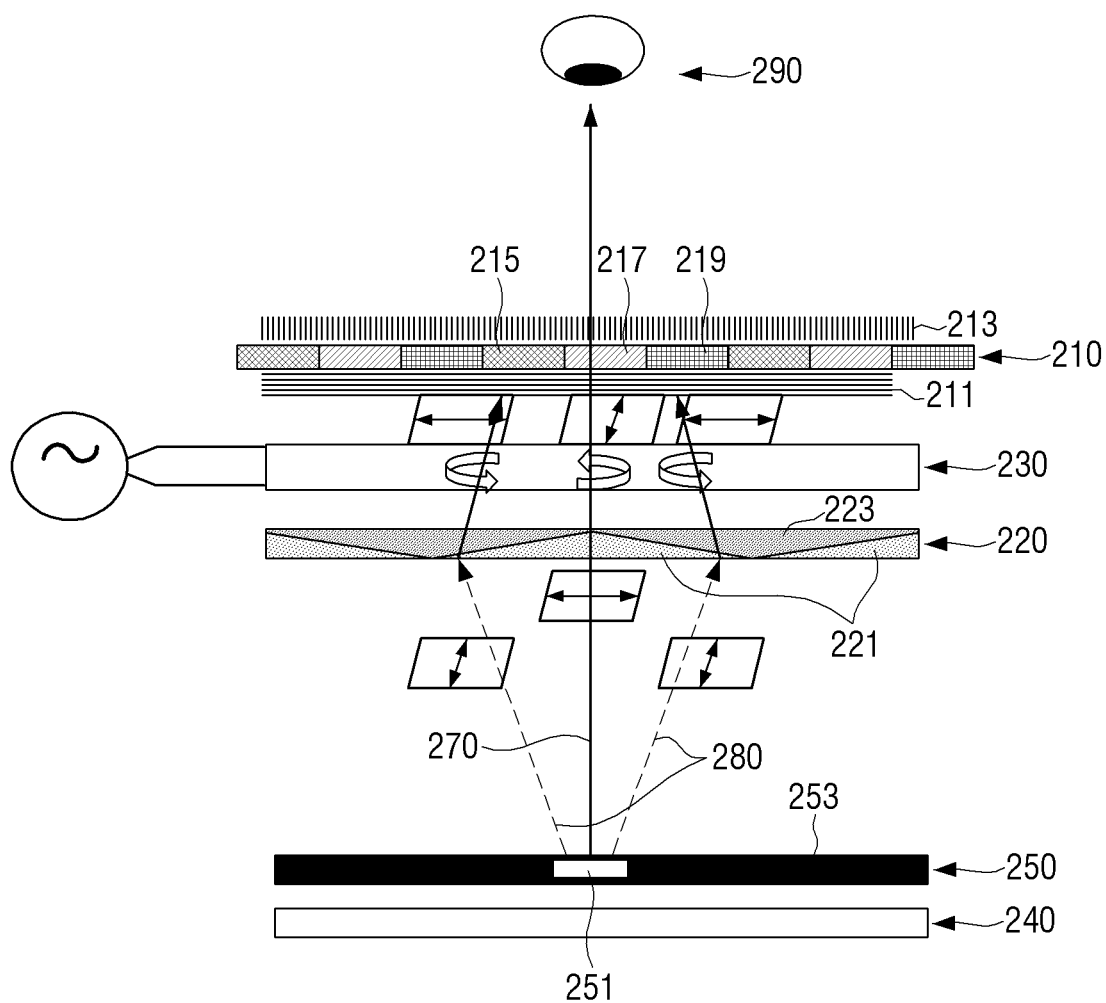

FIGS. 7A and 7B are views illustrating a structure of a display device 200 according to another exemplary embodiment.

Referring to FIGS. 7A and 7B, some elements of the present exemplary embodiment correspond to some elements of FIG. 2, and redundant descriptions thereof are omitted below. However, structures of a prism panel 220 and a light path adjuster 230 in the present exemplary embodiment, as will be described below, are different from those of the prism panel 120 and the light path adjuster 130 of FIG. 2. The same elements of the present exemplary embodiment as those of FIG. 2 are denoted by the same reference numerals. Different elements of the present exemplary embodiment from those of FIG. 2 will be mainly described.

Referring to FIGS. 7A and 7B, the display device 200 includes an image input unit 201 (e.g., image inputter or image input device), a renderer 203, the display panel 210, the prism panel 220, the light path adjuster 230, a light source unit 240 (e.g., light source), a line light source pattern light guide plate 250, a controller 260, first and second lights 270 and 280, and an optical view 290.

As in the exemplary embodiment of FIG. 2, the prism panel 220 includes a first prism array 221 having an isosceles triangular cross-section. A second prism array 223 may be realized to have an isosceles triangular cross-section so as to correspond to the first prism array 221. In the present exemplary embodiment, a resolution is increased to two times more than an image having a resolution that is lowered with an increase in the number of views. Therefore, the first prism array 221 does not need to be realized as a prism having a saw-edged shape for increasing a resolution to three or more times.

The first prism array 221 may be formed of or include an optically transparent material, and a refractive index of the first prism array 221 may be designed to be "no". The second prism array 223 is a liquid crystal polymer layer and is stacked on the first prism array 221. The second prism array 223 is formed of or includes a double refraction material having refractive indexes of "no" and "ne". In other words, the second prism array 223 is formed of an optically anisotropic material having a refractive index that varies according to whether light is polarized. For example, the second prism array 223 may be formed of or include a liquid crystal polymer where a liquid crystal and a polymer used for a liquid crystal display (LCD) are mixed or combined. The second prism array 223 has a different refractive index from the first prism array 221 with respect to light that is polarized in a first direction "↕". The second prism array 223 has the same refractive index as the first prism array 221 with respect to light that is polarized in a second direction "↔". In the present exemplary embodiment, if a refraction direction of light is adjusted in a desired direction, positions of the first and second prism arrays 221 and 223 may be changed.

In the present exemplary embodiment, the light path adjuster 230 is realized as a polarization switch device that is disposed between the display panel 210 and the prism panel 220. Also, the controller 260 alternately and differently adjusts a polarization state of the polarization switch device 230 for one image frame period. The controller 260 also enables light having a first polarization direction to penetrate through the polarization switch device 230 and then to be irradiated onto first and second sub pixel areas 215 and 219 in a first polarization state. In addition, the controller 260 enables light having a second polarization direction to penetrate through the polarization switch device 230 and then to be irradiated onto a third sub pixel area 217 positioned between the first and second sub pixel areas 215 and 219.

In detail, the polarization switch device 230 enables on and off states to alternate so as to adjust a polarization direction of passing light. In the present exemplary embodiment, if the polarization switch device 230 is in a first polarization state that is the on state, a polarization direction of light is not changed. If the polarization switch device 230 is in a second polarization state that is the off state, the polarization direction of the light is changed to be orthogonal to an original polarization direction. However, it is understood that one or more other exemplary embodiments are not limited thereto. For example, according to another exemplary embodiment, if the polarization switch device 230 is in the on state, the polarization direction of the light may be designed to be changed.

FIG. 7A illustrates a first polarization state where the polarization switch device 230 is in an on state. Light that is emitted from a pattern part 251 is divided into a first light 280 that is polarized in a first direction "↕" and a second light 270 that is polarized in a second direction "↔" orthogonal to the first polarization direction "↕". The first light 280 is polarized in the first direction "↕" and thus passes through the prism panel 220 at a preset refraction angle. The second light 270 is polarized in the second direction "↔" and thus passes through the prism panel 220 without being refracted.

The first and second lights 280 and 270 that pass through the prism panel 220 pass through the polarization switch device 230. However, if the polarization switch device 230 is in an on state, polarization directions of the first and second lights 280 and 270 are not changed in the present exemplary embodiment. Therefore, the first light 280 that is polarized in the first direction "↕" passes through the display panel 210 so as to display an image. The second light 270 that is polarized in the second direction "↔" does not pass through a polarizer 211 but is absorbed from the polarizer 211. Therefore, the first light 280 displays images of first and third pixels 215 and 219, and a viewer 290 recognizes that the first light 280 is irradiated from virtual pattern parts.

FIG. 7B illustrates a second polarization state where the polarization switch device 230 is in an off state. Most elements of FIG. 7B are the same as or similar to elements of FIG. 7A, but a state of the polarization switch device 230 is different. The same elements of FIG. 7B as those of FIG. 7A are denoted by the same reference numerals. Different elements of FIG. 7B from elements of FIG. 7A will be mainly described.

The first and second lights 280 and 270 that pass through the prism panel 220 pass through the polarization switch device 230. However, since the polarization switch device 230 is in the off state, a direction of polarized light is changed to be orthogonal to an original polarization direction of the incident light. Therefore, the first light 280 that is polarized in the first direction "↕" is polarized in the second direction "↔". The second light 270 that is polarized in the second direction "↔" is polarized in the first direction "↕". As a result, the first light 280 does not pass through the display panel 210, and the second light 270 passes through the display panel 210 to display an image. Therefore, the viewer 290 recognizes that the second light 270 is irradiated from the real pattern part 251.

In the present exemplary embodiment, the polarization switch device 230 alternately drives on and off states for one image frame period. In detail, if the polarization switch device 230 is in the on state, the display panel 210 simultaneously displays two odd-numbered sub pixels 215 and 219 from two virtual pattern parts that are formed beside both sides of the pattern part 251. If the polarization switch device 230 is in the off state, the display panel 210 displays one even-numbered sub pixel 217 from the pattern part 251. In this case, the controller 260 controls the polarization switch device 230 and the display panel 210 to synchronize with each other. Also, a resolution of each view is increased to two times more than an image having a resolution that is lowered with an increase in the number of views.

A method of controlling a display device according to an exemplary embodiment will now be described.

Figure 8:
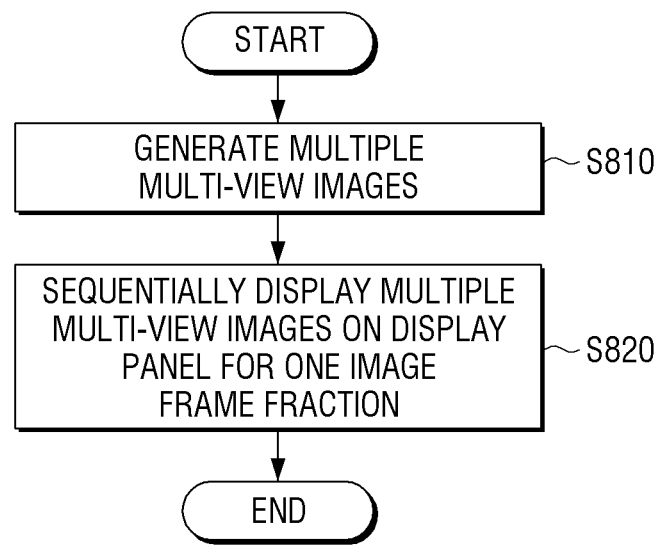
FIG. 8 is a flowchart illustrating a method of controlling a display device, according to an exemplary embodiment.

FIG. 8 is a flowchart illustrating a method of controlling a display device according to an exemplary embodiment.

A plurality of different views are rendered based on a depth of an input image.

In operation S810, a plurality of multi-view images are generated based on a pixel value constituting the plurality of different views that are rendered.

In operation S820, the plurality of multi-view images are sequentially displayed for one image frame period.

Here, the display device includes a display panel, a prism panel that is disposed on a rear surface of the display panel, a light path adjuster that is disposed on at least one surface of the prism panel to apply an analog voltage to the prism panel, a line light source pattern light guide plate that is disposed on a rear surface of the prism panel, and a light source unit that is disposed on a rear surface of the line light source pattern light guide plate.

Also, in operation S820, when the plurality of multi-view images are sequentially provided, a driving state of the light path adjuster is differently controlled so as to differently change a path of light that is provided from the light source unit to the prism panel through the line light source pattern light guide plate. Therefore, the light provided from the light source unit may be irradiated onto different pixel areas of the display panel.

Here, the display panel synchronizes with an analog voltage of the light path adjuster to display m sequential different multi-view images and satisfy m≤n (wherein n is the number of views). Also, a resolution of each of optical views may be m/n.

In addition, in operation S820, for a first time interval of the one image frame period, a first state voltage may be applied to first and second transparent electrodes to enable light to go straight from at least a part of a pattern part and then to be irradiated onto a first sub pixel of the display panel so as to form an optical view in a preset viewing zone.

For a second time interval of the one image frame period, a second state voltage is applied to the first and second transparent electrodes to enable light passing through the at least part of the pattern part to be refracted from the prism panel and then to be irradiated onto a second sub pixel adjacent to the first sub pixel so as to form an optical view in the same viewing zone as the preset viewing zone.

For an $m^{th}$ time interval of the one image frame period, an $m^{th}$ state voltage may be applied to enable light passing through the at least part of the pattern part to be refracted from the prism panel and then to be irradiated onto an $m^{th}$ sub pixel adjacent to an $m-1^{st}$ sub pixel so as to form an optical view in the same viewing zone as the preset viewing zone.

Also, in operation S820, for the one image frame period, off and on voltages may be alternately applied to the first and second transparent electrodes to irradiate light onto an even-numbered sub pixel of the display panel when the off voltage is applied and irradiate light onto an odd-numbered sub pixel of the display panel when the on voltage is applied.

The method may further include controlling the light path adjuster to operate in a 2D mode where for the one image frame period, a driving speed of the light path adjuster is increased to a preset speed or more to irradiate light passing through a plurality of patterns onto all sub pixels of the display panel so as to provide a 2D image.

Figure 9:
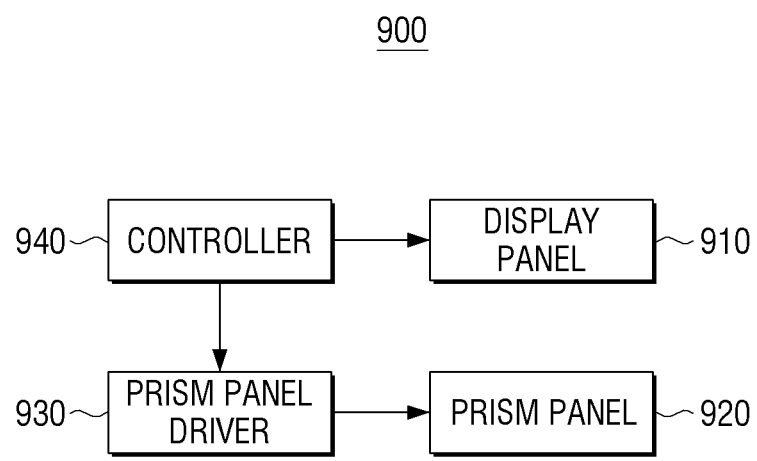
FIG. 9 is a block diagram illustrating a configuration of a display device according to an exemplary embodiment.

FIG. 9 is a block diagram to describe a configuration of a display device 900 according to an exemplary embodiment.

Referring to FIG. 9, a display device 900 according to an exemplary embodiment includes a display panel 910, a prism panel 920, a prism panel driver 930, and a controller 940.

The display panel 910 includes a plurality of pixels respectively composed of a plurality of sub pixels.

In particular, the display panel 910 includes a pixel array where pixels are arranged in a matrix shape. Each of the pixels includes N (where N is a positive integer greater than 2) number of sub pixels. For example, each pixel can be composed of R(red), G(green), B(blue) sub pixels or R, G, B, W(white) sub pixels.

In the meantime, the display panel 910 can be implemented in various ways. For example, the display panel 910 can be implemented as a liquid crystal display panel, an organic light emitting diode (OLED) display panel, and so on.

In this case, the display device 900 may further include additional configurations according to the configuration method of the display panel 910.

For example, when the display panel 910 is in a liquid crystal, the display device 900 may further include a backlight unit providing light to the liquid crystal display panel (that is, LCD panel) and a driving circuit for displaying video data on the liquid crystal display panel. Such constituent elements can be controlled by the controller 940.

Here, the driving circuit, by converting pixel data with respect to video data by analog gamma voltage, generates data voltage and provides the data voltage to data lines. In addition, the driving circuit generates a gate pulse synchronized to the data voltage and shifts the gate pulse, to sequentially provide the gate pulse to the gate line.

In the meantime, at each of the points where data lines and gate lines are crossed, pixels may be located. In the sub pixels, a thin film transistor (TFT) and pixel electrode connected to the TFT can be provided. The TFT, in response to the gate pulse, is turned on and transmits data voltage provided through the data line to pixel electrodes.

According to the above method, for each sub pixel, a sub pixel with respect to video data is entered, and a corresponding sub pixel value may be displayed. For example, when data is 8 bits and white is expressed through one pixel, at each of R, G, B sub pixels constituting the corresponding pixel, a sub pixel corresponding to 255 grayscale value is entered, and a sub pixel value corresponding to 255 grayscale value can be displayed.

In the above example, the display panel 910 is implemented as a liquid crystal. However, it is understood that one or more other exemplary embodiments are not limited thereto, and the display panel 910 may display video data by various methods according to various implementation methods.

The prism panel 920 is disposed at one side of the display panel 910 and includes a prism array and liquid crystal.

Specifically, the prism panel 920 can be disposed to be apart from a front surface (that is, a surface where video is displayed) of the display panel 910 as much as a preset distance. That is, the prism panel 920 may be disposed between the display panel 910 and a viewer.

In addition, the prism panel 910 includes the prism array and liquid crystal. Hereinbelow, with reference to FIG. 10, the structure of the prism panel 920 according to an exemplary embodiment will be described in a greater detail.

Figure 10:
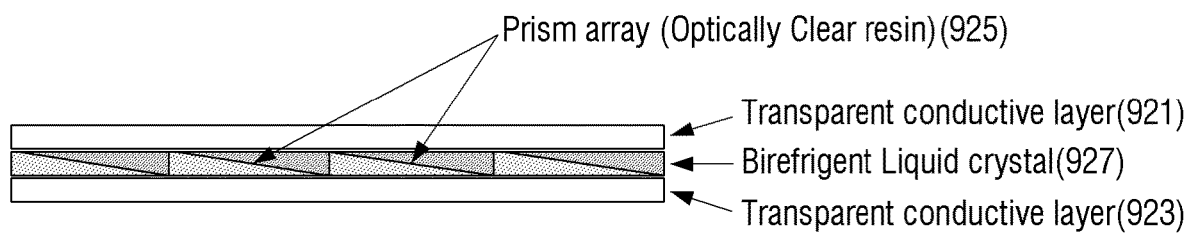
FIG. 10 is a view illustrating a configuration of a prism panel according to an exemplary embodiment.

Referring to FIG. 10, the prism panel 920 includes two conductive layers 921, 923, and a prism array 925 disposed between the two conductive layers 921, 923.

The conductive layers 921, 923 are implemented as an optically transparent material. Here, the first conductive layer 921 is disposed at an upper side of the prism array 925, and the second conductive layer 923 is disposed at a lower side of the prism array 925.

The prism array 925 includes a specific refractive index (for example, $n_p(=n_e)$) and is implemented as a transparent material. In addition, each prism of the prism array 925 has a saw tooth shape having a preset or predetermined inclined angle, and a height of each prism can be approximately 10 μm or less in order to maintain a sufficiently high switching speed. According to some exemplary embodiments, the prism can have an isosceles triangle shape.

Furthermore, a space between the prism array 925 and the conductive layer, specifically, the space between the prism array 925 and the first conductive layer 921, is filled with birefringent liquid crystal. For convenience of description, the prism array 925 composed of a plurality of prisms is referred to as the first prism array 925, and the liquid crystal layer 927 filled with liquid crystal is referred to as the second prism array 927.

The first prism array 925 has a specific refractive index, while the liquid crystal field to the second prism array 927 has a changeable refractive index according to changes in applied electrical field. Accordingly, in accordance with voltage applied to the prism panel 920, there may be a difference in refractive index between the first prism array 925 and the second prism array 927, and according to the difference of refractive index, a refractive angle of light that passes through the prism panel 920 can be changed. Likewise, in that the prism panel 920 changes a refractive angle according to applied voltage, the prism panel 920 is a switchable prism array.

Turning back to FIG. 9, the prism panel driver 930 applies voltage to the prism panel 920. Such operation can be controlled by the controller 940.

In this case, the prism panel driver 930 may apply, to the prism panel 920, the voltage at a level that allows the difference of refractive index of liquid crystal filled in the first prism array 925 and the second prism array 927 to be a preset value.

Specifically, when voltage is applied to the prism panel 920, there is a difference of voltage between the first conductive layer 921 and the second conductive layer 923, and accordingly, refractive index of liquid crystal filled in the second prism array 927 is changed. In other words, according to changes in an applied electric field, the refractive index of liquid crystal with respect to linearly polarized light changes within a scope of ne~no, and thus, the director orientation can change from a horizontal direction to a vertical direction to the conductive layers 921, 923.

Accordingly, the prism panel driver 930, by applying a preset level of voltage to the prism panel 920, may set that the difference of refractive index with respect to polarization of liquid crystal and a material composing the first prism array 925 can be a preset value.

For example, the prism panel driver 930 may apply, to the prism panel 920, the first level voltage ($V_0$) which causes the refractive index of liquid crystal to be $n_0$. The optical material composing the first prism array 925 is $n_p$, and when the first level voltage is applied to the prism panel 920, the refractive index of the first prism array 925 and the refractive index of liquid crystal become equal, and the difference of refractive index thereof is $0 (=\Delta n_0 (=n_p - n_0))$.

As such, the prism panel driver 930 may apply, to the prism panel 920, the first level voltage that causes the difference in refractive index between the first prism array 925 and the crystal liquid to be 0. In addition, when the difference of refractive index between the first prism array 925 and liquid crystal is 0, a state of the prism panel 920 may be referred to as a zero state.

In addition, the prism panel driver 930 may apply, to the prism panel 920, the second level voltage ($V_1$) that causes the refractive index of liquid crystal to be $n_1$. Here, $n_1 < n_0$. The refractive index composing the first prism array 925 is $n_p$, and therefore, when the second level voltage is applied to the prism panel 920, the difference of refractive index between the first prism array 925 and liquid crystal is $\Delta n_1 (=n_p - n_1)$.

As such, the prism panel driver 930 may apply, to the prism panel 920, the second level voltage that causes the difference of refractive index between the first prism array 925 and liquid crystal to be $\Delta n_1$. In addition, when the difference of refractive index between the first prism array 925 and liquid crystal is $\Delta n_1$, a state of the prism panel 920 may be referred to as the first state.

In addition, the prism panel driver 930 may apply, to the prism panel 920, the third level voltage ($V_2$) that causes the refractive index of liquid crystal to be $n_2$. Here, $n_2 < n_1$. The refractive index of an optical material composing the first prism array 925 is $n_p$, and thus, when the third level voltage is applied to the prism panel 920, the difference of refractive index between the first prism array 925 and liquid crystal is $\Delta n_2 (=n_p - n_2)$.

As such, the prism panel driver 930 may apply, to the prism panel 920, the third level voltage that causes the difference of refractive index between the first prism array 925 and liquid display to be $\Delta n_2$. In addition, when the difference of refractive index between the first prism array 925 and liquid crystal is $\Delta n_2$, a state of the prism panel 920 may be referred to as a second state.

As such, the prism panel driver 930 may apply, to the prism panel 920, the N level voltage($V_{N-1}$) that causes the refractive index of liquid crystal to be $n_N$. Here, $n_{N-1} < n_{N-2}$. The refractive index composing the first prism array 925 is $n_p$, and thus, when the N level voltage is applied to the prism panel 920, the difference of refractive index between the first prism array 925 and liquid crystal is $\Delta n_{N-1}(=n_p-n_{N-1})$.

As shown above, the prism panel driver 930 may apply, to the prism panel 920, the N level voltage that causes the difference of refractive index between the first prism array 925 and the liquid crystal to be $\Delta n_{N-1}$. In addition, when the difference of refractive index between the first prism array 925 and liquid crystal is $\Delta n_{N-1}$, a state of the prism panel 920 may be referred to as N-1$^{th}$ state.

In this case, the first voltage level<the second voltage level< . . . <the Nth voltage level.

Consequently, the prism panel driver 930 may apply, to the prism panel 920, the first to Nth level that causes the difference of refractive index between the first prism array 925 and liquid crystal to be 0, $\Delta n_1$, $\Delta n_2$, . . . , $\Delta n_{N-1}$.

Here, N is a value that is identical to the number of sub pixels composing one pixel. For example, when one pixel is composed of three sub pixels (that is, R, G, B sub pixels), N=3, and when one pixel is composed of four sub pixels (that is, R, G, B, W sub pixels), N=4.

The controller 940 controls overall operations of the display device 900. To do this, the controller 940 may include a central processing unit (CPU), a random access memory (RAM), and a read only memory (RIM) for operations of the display device 900.

In particular, the controller 940 displays (e.g., outputs, presents, controls for display, etc.) a plurality of image frames on the display panel 910, and while the image frame is displayed, controls an operation state of the prism panel 920 variably.

Specifically, the controller 940 may divide an image frame into a plurality of image frames (or a plurality of sub image frames) based on the number of sub pixels. That is, the controller 940 may divide each of a plurality of image frames constituting a video image into image frames as much as the number of sub pixels.

For example, the controller 940 may divide an image frame in pixel line units, and by using parts of the image frame divided in pixel line units, divide the image frame into an image frame as much as the number of sub pixels.

Hereinbelow, with reference to FIG. 11, an example of a case in which one pixel is composed of three sub pixels (that is, R, G, B sub pixels) to describe a method of dividing an image frame into a plurality of image frames according to one or more exemplary embodiments.

Figure 11:
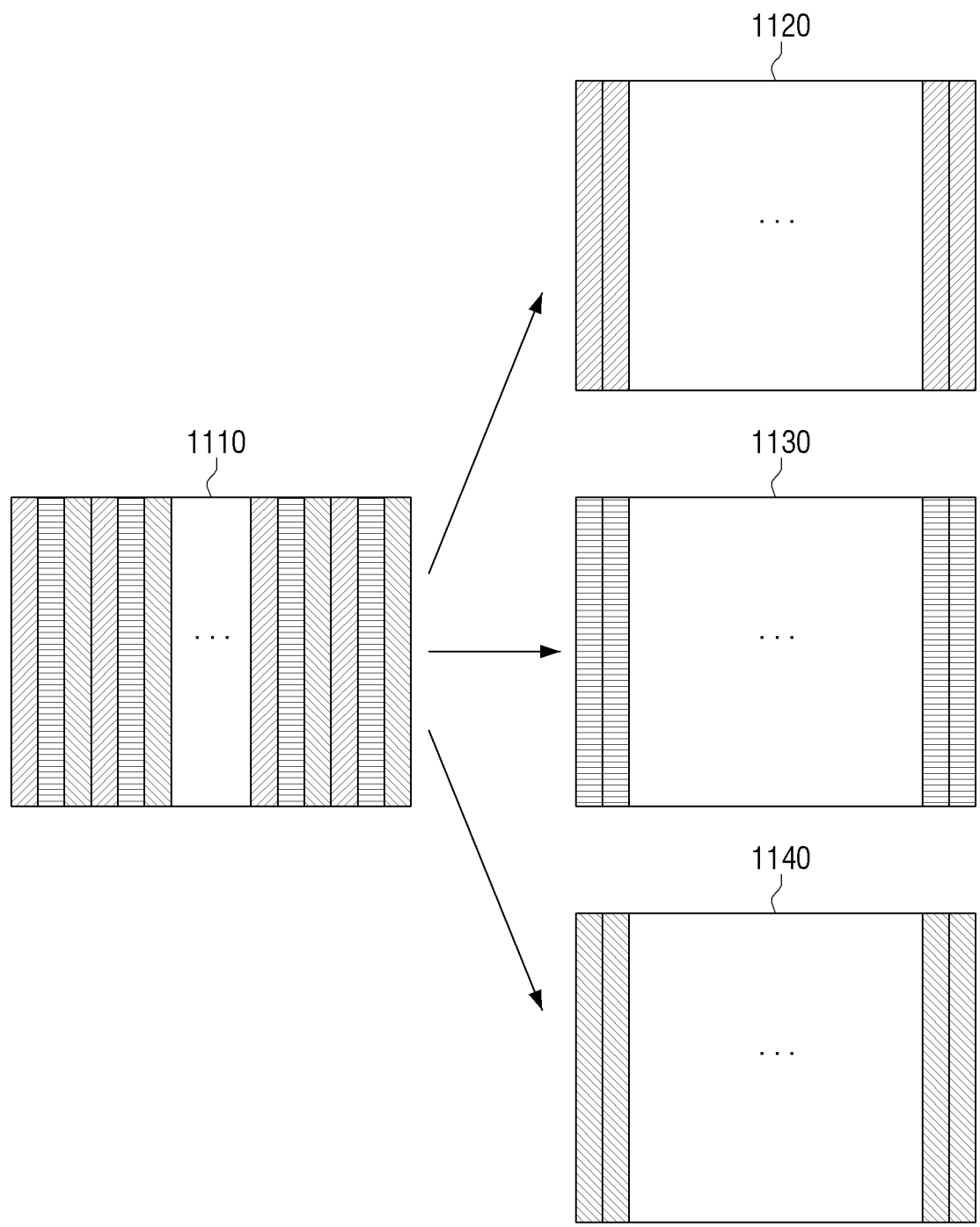
FIGS. 11 through 17 are views illustrating operations of a display device according to one or more exemplary embodiments.

Referring to FIG. 11, the controller 940 may divide the image frame 1110 in pixel line units in a column direction. Accordingly, the image frame can be divided into image frame portions corresponding to each pixel line.

In addition, the controller 940, by using image frames corresponding to each pixel line, may divide the image frame into three image frames.

For example, as illustrated in FIG. 11, the controller 840 may generate an image frame 1120 by combining image frames corresponding to the first, fourth, seventh . . . pixel lines, generate an image frame 1130 by combining image frames corresponding to the second, fifth, eighth . . . pixel lines, and generate an image frame 1140 by combining image frames corresponding to the third, sixth, ninth . . . pixel lines.

According to the above method, the controller 940 may divide the image frame 1110 into three image frames 1120, 1130, 1140. Here, when an image frame constituting the video data is a high resolution image, each of the divided image frames can be an image of a low or lower resolution.

The controller 940 may control the display panel 910 to shift and display sub pixel values for each of a plurality of image frames, and while the sub pixel values are shifted and displayed, may control the prism panel driver 930 so that a variable level of voltage can be applied to the prism panel 920.

As described above, when the first to Nth level voltage is respectively applied to the prism panel 920, the difference of refractive index between the first prism array 925 and the liquid crystal is 0, $\Delta n_1$, $\Delta n_2$, . . . , $\Delta n_{N-1}$.

Herein, when the difference of refractive index between the first prism array 925 and liquid crystal is 0, the light emitted from the display panel 910 is emitted straightly without being refracted by the prism panel 920.

However, when there is a difference of refractive index between the first prism array 925 and liquid crystal, light emitted from the display panel 910 is refracted as much as a refraction angle corresponding to the refractive index by the prism panel 920 and the propagation direction is changed.

Specifically, when the difference of refractive index is $n_1$, light emitted from the display panel 910 is refracted as much as the refractive angle corresponding to $n_1$. When the difference of refractive index is $n_2$, light emitted from the display panel 910 is refracted as much as the refractive angle corresponding to $n_2$. When the difference of refractive index is $n_3$, light emitted from the display panel 910 is refracted as much as the refractive angle corresponding to $n_3$. When the difference of refractive index is $n_{N-1}$, light emitted from the display panel 910 is refracted as much as the refractive angle corresponding to $n_{N-1}$.

Here, the greater the difference of refractive index between the first prism array 925 and liquid crystal is, the greater the refractive angle would be. That is, the comparative size of refractive index is $\Delta n_1 < \Delta n_2 < \ldots < \Delta n_{N-1}$, and thus, the comparative size of refractive index is: preset first refractive angle, when difference of refractive index is $\Delta n_1$<when difference of refractive index is $\Delta n_2$, the preset second refractive angle< . . . <when difference of refractive index is $\Delta n_{N-1}$, preset N-1 refractive angle.

When light emitted from the display panel 910 is refracted, a viewer that is at a viewing distance (that is, position distant from the display panel 910 as much as a specific distance) may see sub pixels of different colors according to a refractive angle.

Figure 12:
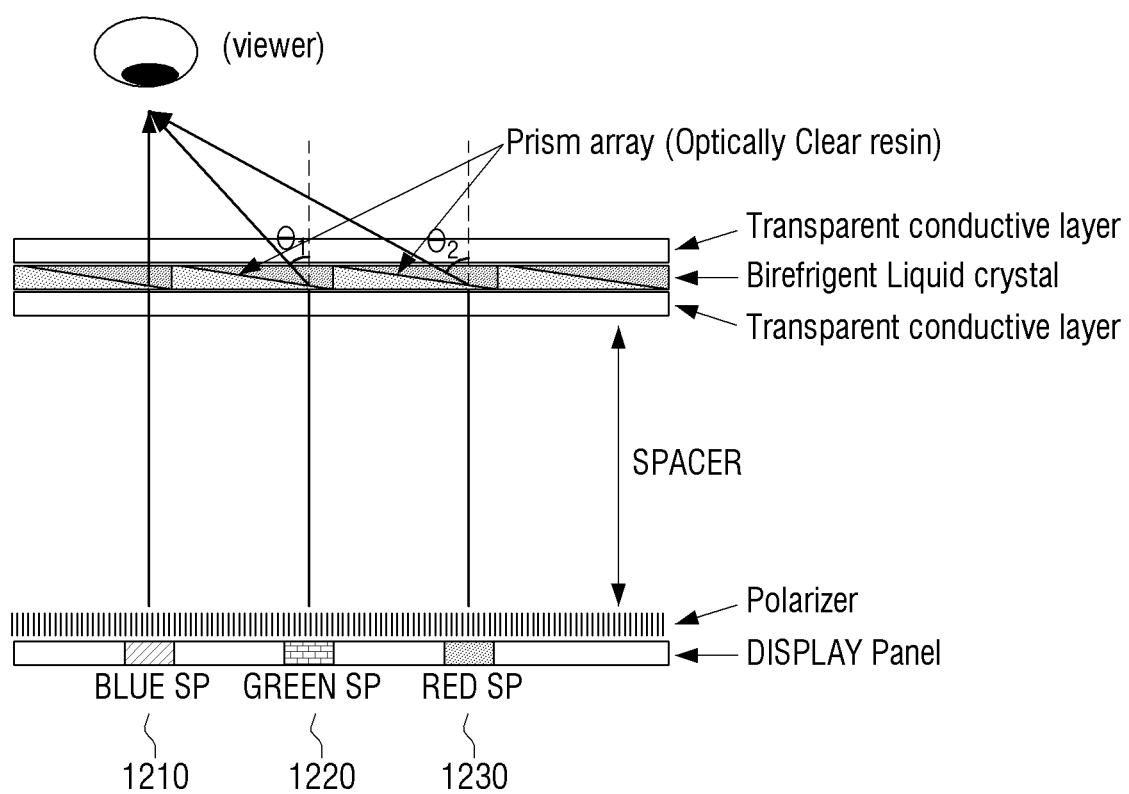

For example, as shown in FIG. 12, when light emitted from the display panel 910 is not refracted by the prism panel 920, a viewer may see B sub pixel (Blue SP(sub pixel), 1210). However, when the light emitted from the display panel 910 is refracted with a specific refractive angle, a viewer may see sub pixels of different colors. For example, when the light emitted from the display panel 910 is refracted as much as the refractive angle N1 by the prism panel 920, a viewer comes to see G sub pixel (Green SP, 1220). In addition, when light emitted from the display panel 910 is refracted by the refractive angle N2 by the prism panel 920, a viewer sees R sub pixel(Red SP, 1230).

Based on the above, in order for the present exemplary embodiment to provide a high resolution image to a viewer, by adjusting voltage level applied to the prism panel 920, specific sub pixels are sequentially provided to a viewer. Additionally, according to a voltage level applied to the prism panel 920, different sub pixel values of pixels with respect to image frames are displayed on a sub pixel provided to a viewer.

Hereinbelow, referring to FIGS. 13 to 16, a case where each pixel is composed of R, G, B sub pixels, and an image frame is divided into three image frames (that is, the first to third image frame) is assumed and a method of providing a high resolution image according to one or more exemplary embodiments will be described in a greater detail.

Figure 13:
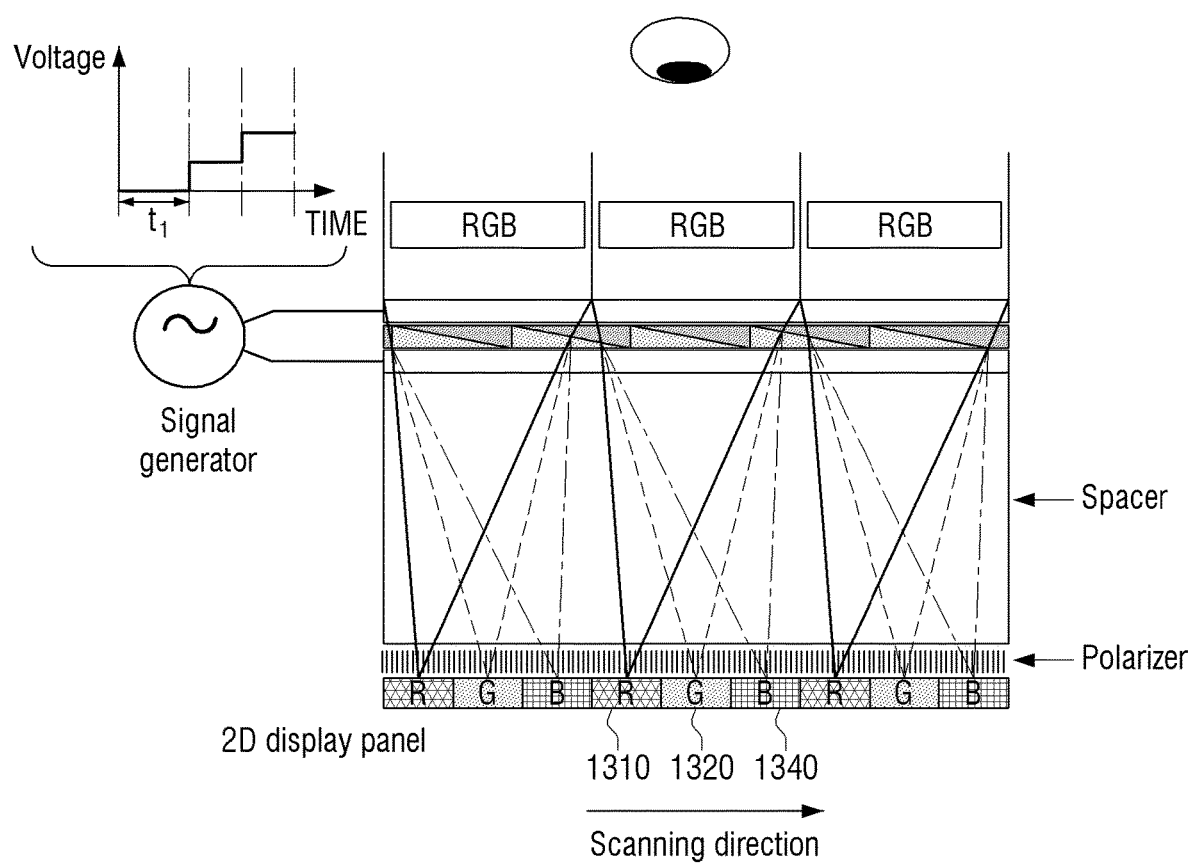

As shown in FIG. 13, the controller 940 may control the prism panel driver 930 so that the first level voltage is applied to the prism panel 920 for a predetermined time ($t_1$). Accordingly, the light emitted from the display panel 910 can be refracted with the first refractive angle by the prism panel 920.

Here, the first voltage level is a voltage level that causes the refractive index of liquid crystal to be identical to the refractive index of the first prism array 925, for example, 0[V]. Therefore, when the first refractive angle is 0, and refraction is in accordance with the first refractive angle, it can be interpreted or understood that light emitted from the display panel 910 is not refracted and goes straight.

As such, when the first level voltage is applied to the prism panel 920 and light emitted from the display panel 910 is refracted with the first refractive angle by the prism panel 920, the controller 940 may display a sub pixel value with respect to the first image frame to the first sub pixel corresponding to the first refractive angle, display a sub pixel value with respect to the second image frame to the second sub pixel corresponding to the first refractive angle, and a sub pixel value with respect to the third image frame to the third sub pixel corresponding to the first refractive angle.

Here, the sub pixels corresponding to the first refractive angle indicate the sub pixels which are focused within a viewing distance, when, from among a plurality of sub pixels composing the display panel 910, light emitted from the display panel 910 is refracted by the prism panel 920 as much as the first refractive angle. This can be predefined based on viewing distance and the first refractive angle.

For example, as shown in FIG. 13, the controller 940, from among sub pixels corresponding to the first refractive angle, may display R sub pixel from among R, G, B sub pixels to express the first image frame to R sub pixel 1310, display G sub pixel from among R, G, B sub pixels to express the second image frame to the G sub pixel 1320, and display B sub pixel from among R, G, B sub pixels to express the third image frame to B sub pixel 1330 from among the sub pixels corresponding to the first refractive angle.

Figure 14:
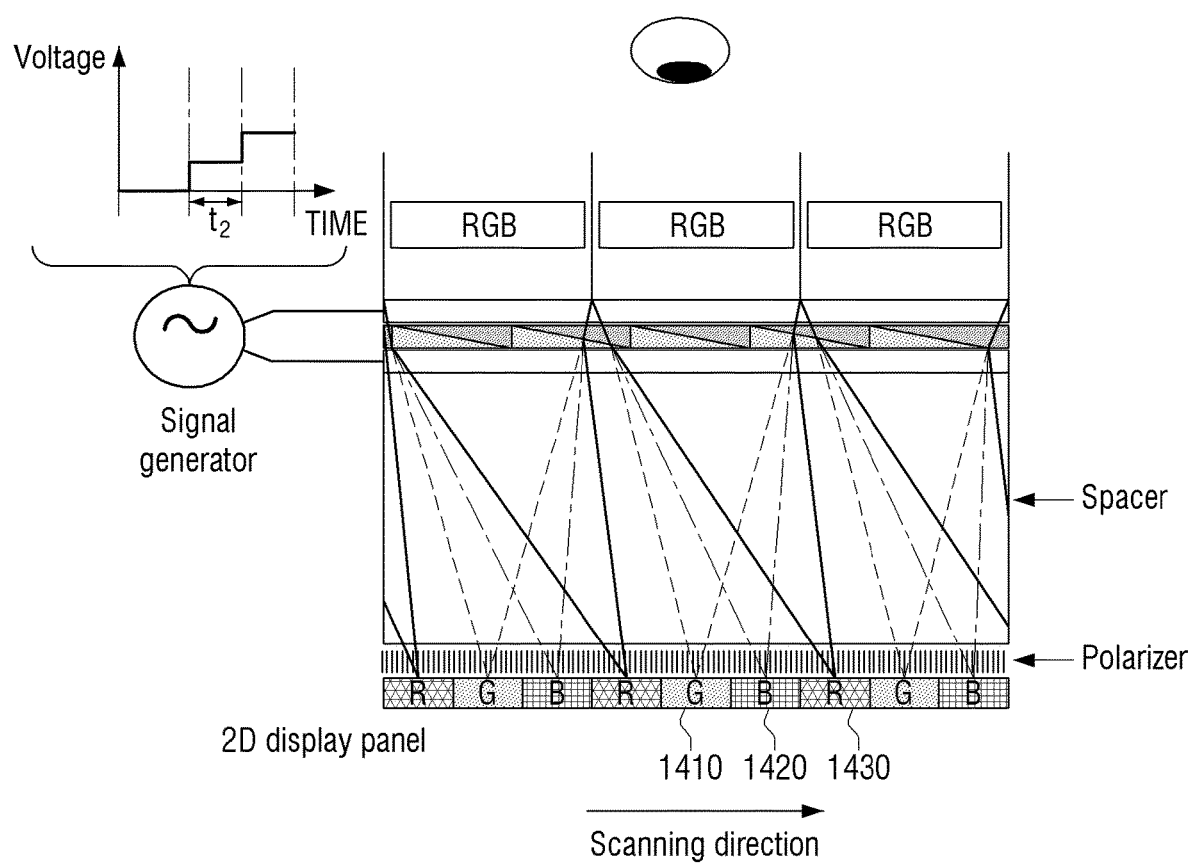

In addition, as shown in FIG. 14, the controller 940 may control the prism panel driver 930 so that the second level voltage is applied to the prism panel 920 for a predetermined time ($t_2$). Accordingly, light emitted from the display panel 910 may be refracted by the prism panel 920 with the second refractive angle.

In this case, the second voltage level is a voltage level that causes the difference of refractive index between liquid crystal and the first prism array 925 to be $\Delta n_1$. Therefore, light emitted from the display panel 910 can be refracted as much as the refractive angle corresponding to $\Delta n_1$ by the prism panel 920.

As such, when the second level voltage is applied to the prism panel 920 and light emitted from the display panel 910 is refracted with the second refractive angle by the prism panel 920, the controller 940 may display a sub pixel value with respect to the first image frame on the fourth sub pixel corresponding to the second refractive angle, display a sub pixel value with respect to the second image frame to the fifth sub pixel corresponding to the second refractive angle, and display a sub pixel value with respect to the third image frame to the sixth sub pixel corresponding to the second refractive angle.

Here, sub pixels corresponding to the second refractive angle indicate the sub pixels that are focused within a viewing distance, when, from among a plurality of sub pixels composing the display panel 910, light emitted from the display panel 910 is refracted by the prism panel 920 as much as the second refractive angle. This can be predefined based on viewing distance and the second refractive angle.

For example, as shown in FIG. 14, the controller 940, from among sub pixels corresponding to the second refractive angle, may display G sub pixel from among R, G, B sub pixels to express the first image frame to G sub pixel 1410, display B sub pixel from among R, G, B sub pixels to express the second image frame to the B sub pixel 1420, and display R sub pixel from among R, G, B sub pixels to express the third image frame to R sub pixel 1430 from among the sub pixels corresponding to the second refractive angle.

Figure 15:
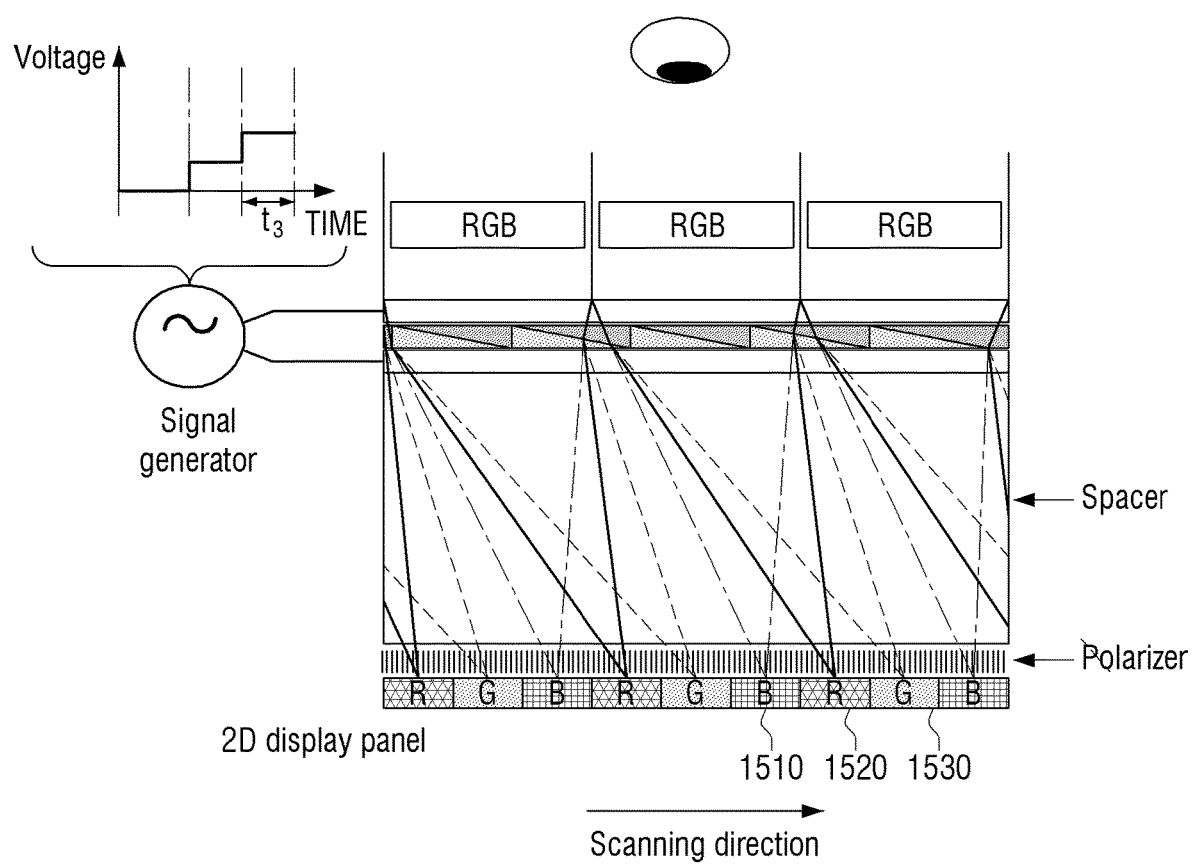

In addition, as shown in FIG. 15, the controller 940 may control the prism panel driver 930 so that the third level voltage is applied to the prism panel 920 for a predetermined time ($t_3$). Accordingly, light emitted from the display panel 910 may be refracted by the prism panel 920 with the third refractive angle.

In this case, the third voltage level is a voltage level that causes the difference of refractive index between liquid crystal and the first prism array 925 to be $\Delta n_2$. Therefore, light emitted from the display panel 910 can be refracted as much as the refractive angle corresponding to $\Delta n_2$ by the prism panel 920.

As such, when the third level voltage is applied to the prism panel 920 and light emitted from the display panel 910 is refracted with the third refractive angle by the prism panel 920, the controller 940 may display a sub pixel value with respect to the first image frame on the seventh sub pixel corresponding to the third refractive angle, display a sub pixel value with respect to the second image frame to the eighth sub pixel corresponding to the third refractive angle, and display a sub pixel value with respect to the third image frame to the ninth sub pixel corresponding to the third refractive angle.

Here, sub pixels corresponding to the third refractive angle indicate the sub pixels that are focused within a viewing distance, when, from among a plurality of sub pixels composing the display panel 910, light emitted from the display panel 910 is refracted by the prism panel 920 as much as the third refractive angle. This can be predefined based on viewing distance and the third refractive angle.

For example, as shown in FIG. 15, the controller 940, from among sub pixels corresponding to the third refractive angle, may display B sub pixel from among R, G, B sub pixels to express the first image frame to B sub pixel 1510, display R sub pixel from among R, G, B sub pixels to express the second image frame to the R sub pixel 1520, and display G sub pixel from among R, G, B sub pixels to express the third image frame to G sub pixel 1530 from among the sub pixels corresponding to the third refractive angle.

The controller 940 may control the display panel 910 to display a plurality of image frames based on the number of sub pixels by increasing the frame rate by N times. Here, N may be a value that is equal to the number of sub pixels.

For example, it is assumed that the number of sub pixels is 3, and a predefined frame rate is 60 Hz.

In this case, the controller 940 may divide each of a plurality of image frames constituting video data to a plurality of image frames based on the number of sub pixels, and display a plurality of image frames by a frame rate of 180 Hz.

As described above, the controller 840, through time division of the first frame section with respect to image data, may display a plurality of image frames that are divided based on the number of sub pixels.

In the meantime, different pixel values with respect to an image frame that is displayed in each time-divided section are sub pixel values with respect to R, G, B sub pixels constituting the same pixel of an image frame, and these can be displayed at a location that is shifted as much as the distance of refractive angle in each time-divided section.

Figure 16:
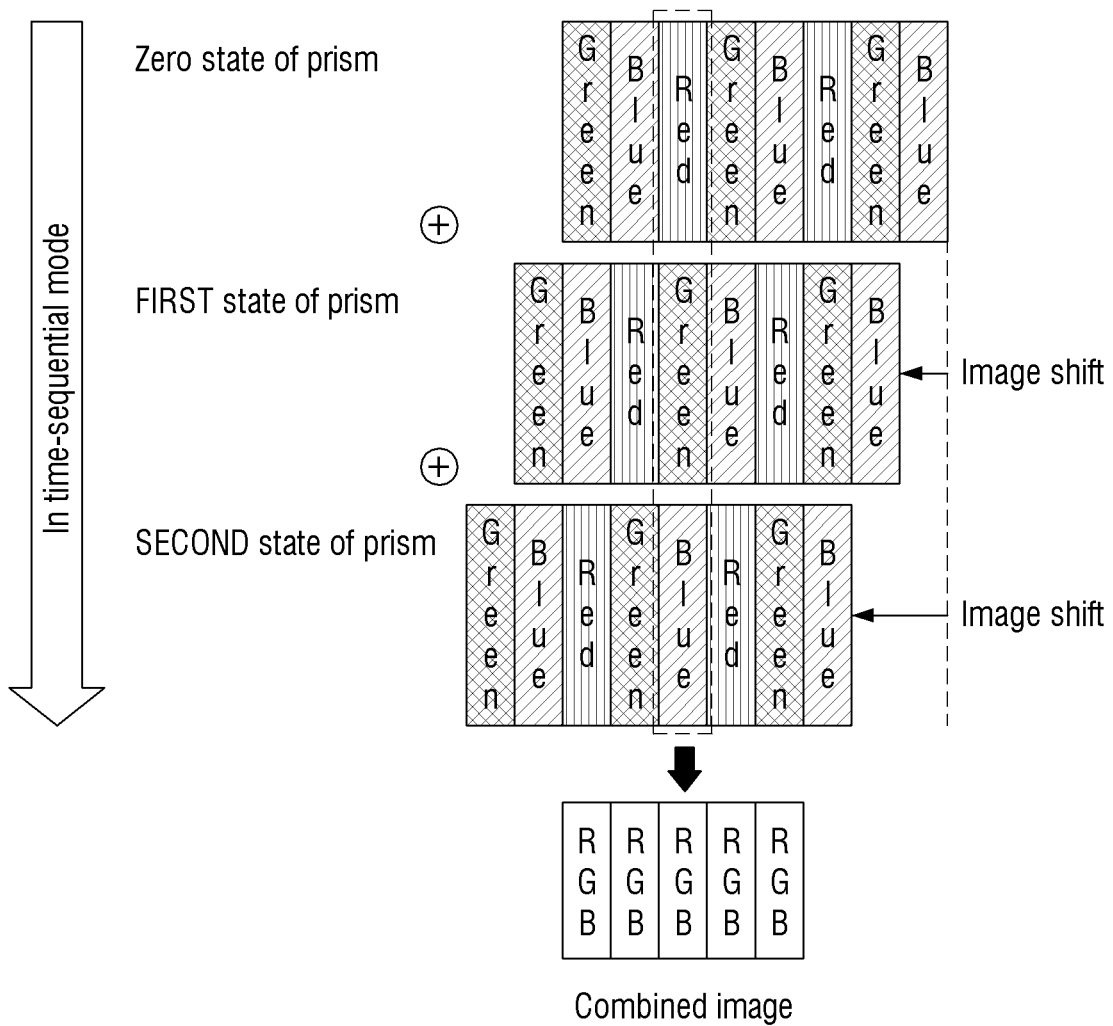

For example, as shown in FIG. 16, when the prism panel 920 is in a zero state (for example, as in FIG. 13), the controller 940 displays an R sub pixel value of a specific pixel to express the first image frame to R sub pixel. Accordingly, a viewer can view an R sub pixel value of a specific pixel to express the first image frame.

In addition, when the prism panel 920 is in a first state (for example, as in FIG. 14), the controller 940 displays G sub pixel of a specific pixel to express the first image frame to the G sub pixel. Here, the G sub pixel may be a G sub pixel that is distant according to a refractive angle of the zero state and the first state, based on R sub pixel viewed to a viewer in zero state. Accordingly, a viewer can view G sub pixel of a specific pixel to express the first image frame.

In addition, when the prism panel 920 is in a second state (for example, as shown in FIG. 15), the controller 940 displays B sub pixel of a specific pixel to express the first image frame on the B sub pixel. Here, B sub pixel may be, based on G sub pixel viewed to a viewer in the first state, the B sub pixel that is located apart according to a distance defined according to a refractive angle of the first state and the second state. Accordingly, a viewer can see B sub pixel of a specific pixel to express the first image frame.

Accordingly, a viewer can see all the R, G, B sub pixels of a specific pixel to express the first image frame, and consequently, with the combination of R, G, B sub pixel values, each of the pixels constituting the first image frame can be viewed. Likewise, a viewer can see each of the pixels constituting the second image frame and the third image frame.

As described above, according to an exemplary embodiment, through time division of the first frame section to N, and shifting and displaying sub pixel values for each of the image frame divided to N based on the number of sub pixels, the divided entire image frame can be provided to a viewer.

As described above, when image frames are provided, an image with resolution that is increased N times can be provided to a viewer. Here, N is the same as the number of sub pixels.

Figure 17:
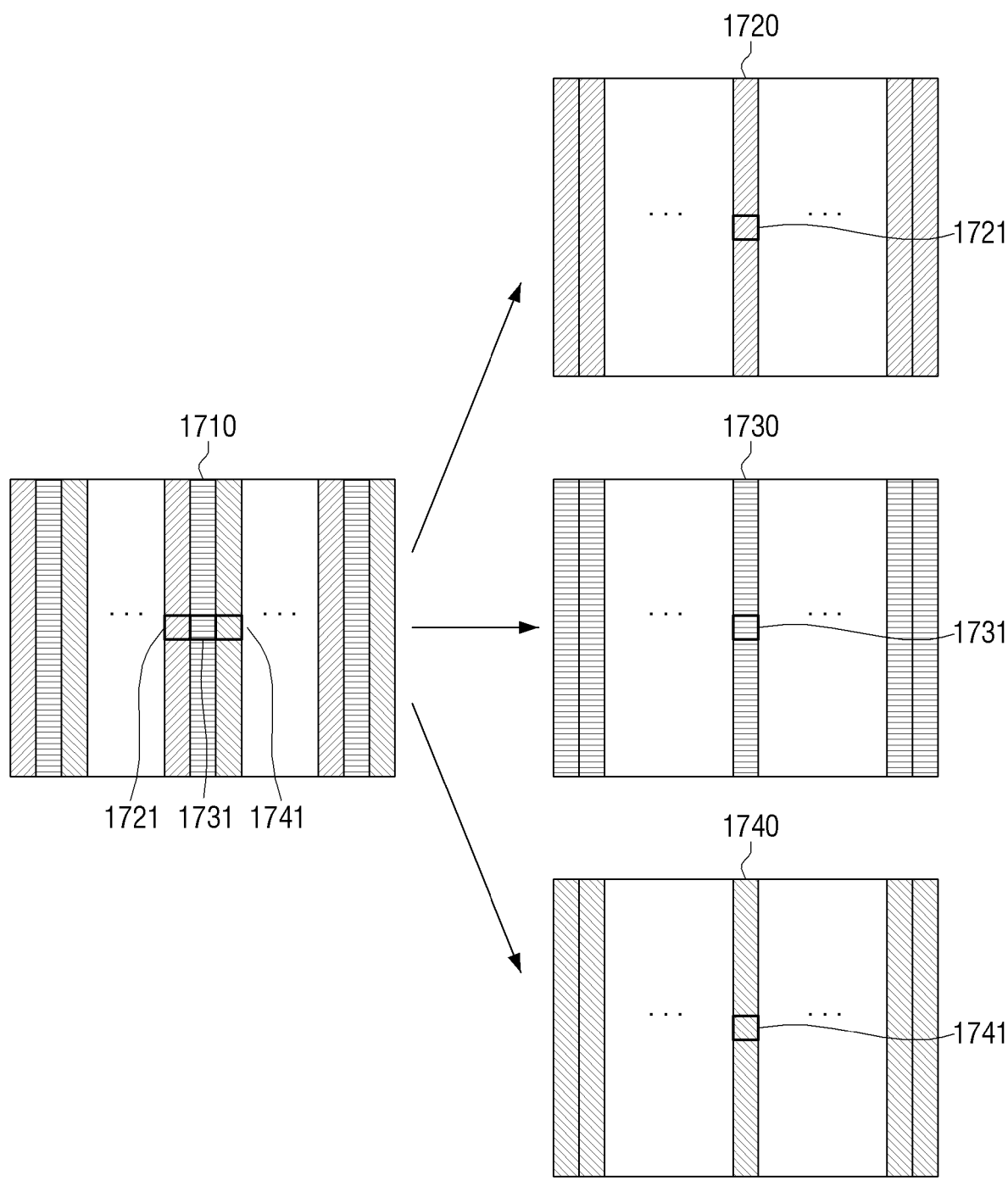

For example, as shown in FIG. 17, it is assumed that the image frame 1710 is divided to three image frames 1720, 1730, and 1740.

In this case, a viewer can view a pixel 1721 of the first image frame 1720 in the first frame section, a pixel 1730 of the second image frame 1730, and a pixel 1741 of the third image frame 1740, and thus, a viewer can be provided with an image having a three times higher resolution.

FIGS. 13 to 17 illustrate an exemplary embodiment based on a sub pixel composing one pixel of each image frame. However, it is understood that one or more other exemplary embodiments are not limited thereto, and the above method can be applied for a plurality of pixels composing the image frame.

In addition, the display device 900 may further include a polarizer disposed on an upper surface of the display panel 910.

Specifically, the prism panel 920 may control a refractive angle with respect to one direction of the linear polarized light, but may not control a refractive angle with respect to orthogonal polarization.

Here, light output from the display panel 910 is unpolarized, and the display device 900 is disposed on an upper side of the display panel 910. Using a polarization plate where an axial direction is parallel with a linear polarization, the polarization direction output from the display panel 910 can be controlled by the prism panel 920.

In addition, while in the above example, a method of increasing a resolution of a 2D image is described, it is understood that one or more other exemplary embodiments are not limited thereto. For example, according to another exemplary embodiment, the method can be provided for a 3D image in the same or similar manner.

To do this, the display device 900 may further include a visual field divider located between the display panel 910 and the prism panel 920.

Figure 18:
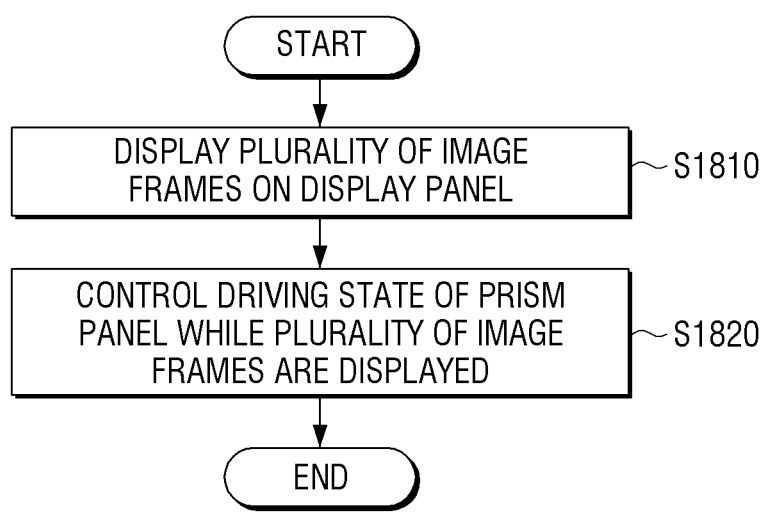
FIG. 18 is a flowchart illustrating a method of controlling a display device according to an exemplary embodiment.

FIG. 18 is a flowchart to describe a method of controlling a display device according to an exemplary embodiment.

In this case, the display device is provided for a display panel including a plurality of pixels respectively composed of a plurality of sub pixels, and may include a prism panel including a prism array and liquid crystal.

Referring to FIG. 18, an image frame is divided into a plurality of image frames based on the number of sub pixels (operation S1810).

In addition, the display panel is controlled so that sub pixel values with respect to the plurality of image frames are shifted and displayed, and while the sub pixel values are shifted and displayed, different levels of voltage are applied to the prism panel (operation S1820).

Herein, each of the plurality of pixels may include R, G, B sub pixels and the image frame can be divided into the first to third image frames.

In addition, at operation S1810, when the first level voltage is applied to a prism panel located in a front direction of the display panel, the sub pixel value with respect to the first image frame is displayed on the first sub pixel corresponding to the first refractive angle, the sub pixel with respect to the second image frame is displayed in the second sub pixel corresponding to the first refractive angle, and the sub pixel value with respect to the third image frame is displayed on the third sub pixel corresponding to the first refractive angle.

In addition, at operation S1810, when the second level voltage is applied to a prism panel located in a front direction of the display panel, and light output from the display panel is refracted with the second refractive angle, the sub pixel value with respect to the first image frame is displayed on the fourth sub pixel corresponding to the second refractive angle, the sub pixel with respect to the second image frame is displayed in the fifth sub pixel corresponding to the second refractive angle, and the sub pixel value with respect to the third image frame is displayed on the sixth sub pixel corresponding to the second refractive angle.

In addition, at operation S1810, when the third level voltage is applied to a prism panel located in a front direction of the display panel, and light output from the display panel is refracted with the third refractive angle, the sub pixel value with respect to the first image frame is displayed on the seventh sub pixel corresponding to the third refractive angle, the sub pixel with respect to the second image frame is displayed in the eighth sub pixel corresponding to the third refractive angle, and the sub pixel value with respect to the third image frame is displayed on the ninth sub pixel corresponding to the third refractive angle.

In these cases, the first to third sub pixels can be R, G, B sub pixels, respectively, the fourth to sixth sub pixels can be G, B, R sub pixels, respectively, and the seventh to ninth sub pixels can be B, R, and G sub pixels, respectively.

While not restricted thereto, an exemplary embodiment can be embodied as computer-readable code on a computer-readable recording medium. For example, a control program that controls the above-described operations of the multi-view display device 100 or 200 may be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses 100, 200 can include circuitry, a processor, a microprocessor, etc., and may execute a computer program stored in a computer-readable medium.

The foregoing exemplary embodiments and advantages are merely exemplary and are not to be construed as limiting. The present teaching can be readily applied to other types of apparatuses. Also, the description of exemplary embodiments is intended to be illustrative, and not to limit the scope of the claims, and many alternatives, modifications, and variations will be apparent to those skilled in the art.

What is claimed is:

1. A display device comprising:
a display panel comprising a plurality of pixels, each of which comprises a plurality of sub pixels;
a prism panel at one side of the display panel and comprising a first layer comprising a prism array, and a second layer comprising a liquid crystal and stacked on the first layer, the first layer being closer to a light source of the display device than the second layer;
a prism panel driver configured to apply voltage to the prism panel; and
a controller configured to display a plurality of image frames on the display panel and to control a driving state of the prism panel variably while the plurality of image frames is displayed
wherein the controller is further configured to:
divide an image frame into the plurality of image frames based on a number of the sub pixels comprised in each of the plurality of pixels,
control the display panel to shift and display sub pixel values for each of the plurality of sub pixels,
control the display panel to shift and display sub pixel values for each of the plurality of image frames,
control the prism panel driver to apply a voltage of variable level to the prism panel while the sub pixel values are shifted and displayed, and
in response to the plurality of image frames being divided into a first image frame, a second image frame, and a third image frame, and a first level voltage applied to the prism panel positioned in a front direction of the display panel and light emitted from the display panel refracted with a first refraction angle by the prism panel, control to display a sub pixel value with respect to the first image frame on a first sub pixel corresponding to the first refraction angle, control to display a sub pixel value with respect to the second image frame on a second sub pixel corresponding to the first refraction angle, and control to display a sub pixel value with respect to the third image frame on a third sub pixel corresponding to the first refraction angle.

2. The display device as claimed in claim 1, wherein each of the plurality of pixels comprises red (R), green (G), and blue (B) sub pixels, and the image frame is divided into a first image frame, a second image frame, and a third image frame.

3. The display device as claimed in claim 1, wherein the controller, in response to a second level voltage applied to the prism panel positioned in the front direction of the display panel and the light emitted from the display panel refracted with a second refraction angle by the prism panel, is configured to control to display a sub pixel value with respect to the first image frame on a fourth sub pixel corresponding to the second refraction angle, to control to display a sub pixel value with respect to the second image frame on a fifth sub pixel corresponding to the second refraction angle, and to control to display a sub pixel value with respect to the third image frame on a sixth sub pixel corresponding to the second refraction angle.

4. The display device as claimed in claim 3, wherein the controller, in response to a third level voltage applied to the prism panel positioned in the front direction of the display panel and the light emitted from the display panel refracted with a third refraction angle by the prism panel, is configured to control to display a sub pixel value with respect to the first image frame on a seventh sub pixel corresponding to the third refraction angle, to control to display a sub pixel value with respect to the second image frame on an eighth sub pixel corresponding to the third refraction angle, and to control to display a sub pixel value with respect to the third image frame on a ninth sub pixel corresponding to the third refraction angle.

5. The display device as claimed in claim 4, wherein:
the first sub pixel, the second sub pixel, and the third sub pixel are R, G, and B sub pixels, respectively;
the fourth sub pixel, the fifth sub pixel, and the sixth sub pixel are G, B, and R sub pixels, respectively; and
the seventh sub pixel, the eighth sub pixel, and the ninth sub pixel are B, R, and G sub pixels, respectively.

6. The display device as claimed in claim 1, wherein:
the prism panel is on a rear side of the display panel;
the display device further comprises a rod source pattern spaced apart from the prism array by a preset interval, disposed on an upper surface of a right source part, and having a pattern part and a non-pattern part alternating in a preset interval; and the controller is configured to sequentially display a plurality of multi-view images on the display panel during one image frame, and to control a driving state of the prism panel while the plurality of multi-view images are sequentially provided so that light provided from the light source part is emitted to different areas of the display panel.

7. The display device as claimed in claim 6, wherein:
the display panel is configured to be synchronized with a voltage that is applied to the prism panel and to display m number of sequential multi-view images; and
the pattern part and the non-pattern part are disposed with a width of 1:n−1, where n is an integer greater than or equal to three, is a number of optical views, and satisfies m<n.

8. The display device as claimed in claim 7, wherein the controller, in an mth section from one image frame section, is configured to apply to the prism panel an mth state voltage so that light passed from at least a part of the pattern part is refracted from the prism panel and is emitted to the m sub pixel area adjacent to an m−1 sub pixel to form an optical view on the preset viewing area.

9. A control method of a display device that includes a display panel comprising a plurality of pixels each of which includes a plurality of sub pixels, and a prism panel at one side of the display panel and comprising a first layer comprising prism array and a second layer comprising a liquid crystal, the method comprising:
displaying a plurality of image frames on the display panel; and
controlling a driving state of the prism panel variably while the plurality of image frames are displayed, the first layer of the prism panel being closer to a light source of the display device than the second layer, wherein:
the displaying comprises dividing an image frame into the plurality of image frames based on a number of the sub pixels included in each of the plurality of pixels, and shifting and displaying sub pixel values for each of the plurality of sub pixels; and
the controlling comprises controlling so that a voltage of variable level is applied to the prism panel while the sub pixel values are shifted and displayed;
the displaying further comprises, in response to the plurality of image frames being divided into a first image frame, a second image frame, and a third image frame, and a first level voltage applied to the prism panel positioned in a front direction of the display panel and light emitted from the display panel refracted with a first refraction angle by the prism panel;
displaying a sub pixel value with respect to the first image frame on a first sub pixel corresponding to the first refraction angle;
displaying a sub pixel value with respect to the second image frame on a second sub pixel corresponding to the first refraction angle; and
displaying a sub pixel value with respect to the third image frame on a third sub pixel corresponding to the first refraction angle.

10. The method as claimed in claim 9, wherein each of the plurality of pixels comprises red (R), green (G), and blue (B) sub pixels, and the image frame is divided into a first image frame, a second image frame, and a third image frame.

11. The method as claimed in claim 9, wherein the displaying comprises, in response to a second level voltage applied to the prism panel positioned in the front direction of the display panel and the light emitted from the display panel refracted with a second refraction angle by the prism panel:
displaying a sub pixel value with respect to the first image frame on a fourth sub pixel corresponding to the second refraction angle;
displaying a sub pixel value with respect to the second image frame on a fifth sub pixel corresponding to the second refraction angle; and
displaying a sub pixel value with respect to the third image frame on a sixth sub pixel corresponding to the second refraction angle.

12. The method as claimed in claim 11, wherein the displaying comprises, in response to a third level voltage applied to the prism panel positioned in the front direction of the display panel and the light emitted from the display panel refracted with a third refraction angle by the prism panel:
displaying a sub pixel value with respect to the first image frame on a seventh sub pixel corresponding to the third refraction angle;
displaying a sub pixel value with respect to the second image frame on an eighth sub pixel corresponding to the third refraction angle; and
displaying a sub pixel value with respect to the third image frame on a ninth sub pixel corresponding to the third refraction angle.

13. The method as claimed in claim 12, wherein:
the first sub pixel, the second sub pixel, and the third sub pixel are R, G, and B sub pixels, respectively;
the fourth sub pixel, the fifth sub pixel, and the sixth sub pixel are G, B, and R sub pixels, respectively; and
the seventh sub pixel, the eighth sub pixel, and the ninth sub pixel are B, R, and G sub pixels, respectively.

14. The method as claimed in claim 9, wherein:
the prism panel is on a rear side of the display panel;
the display device further comprises a rod source pattern spaced apart from the prism array by a preset interval, disposed on an upper surface of a right source part, and having a pattern part and a non-pattern part alternating in a preset interval;
the displaying comprises sequentially displaying a plurality of multi-view images on the display panel during one image frame; and
the controlling comprises controlling a driving state of the prism panel while the plurality of multi-view images are sequentially provided so that light provided from the light source part is emitted to different areas of the display panel.

15. The method as claimed in claim 14, wherein:
the display panel is synchronized with voltage that is applied to the prism panel and displays m number of sequential multi-view images; and
the pattern part and the non-pattern part are disposed with a width of 1:n−1, where n is an integer greater than or equal to three, is a number of optical views, and satisfies m<n.

16. The method as claimed in claim 15, wherein the controlling further comprises, in an mth section from one image frame section, applying to the prism panel an mth state voltage so that light passed from at least a part of the pattern part is refracted from the prism panel and is emitted to the m sub pixel area adjacent to an m−1 sub pixel to form an optical view on the preset viewing area.

* * * * *